United States Patent
Zhang et al.

(10) Patent No.: US 11,792,851 B2
(45) Date of Patent: Oct. 17, 2023

(54) BEAM SPECIFIC CHANNEL SENSING FAILURE

(71) Applicant: QUALCOMM Incorporated, San Diego, CA (US)

(72) Inventors: Xiaoxia Zhang, San Diego, CA (US); Ozcan Ozturk, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 17/184,175

(22) Filed: Feb. 24, 2021

(65) Prior Publication Data

US 2022/0272752 A1    Aug. 25, 2022

(51) Int. Cl.
| | |
|---|---|
| H04W 74/08 | (2009.01) |
| H04W 76/19 | (2018.01) |
| H04W 76/18 | (2018.01) |
| H04W 74/00 | (2009.01) |
| H04W 80/02 | (2009.01) |

(52) U.S. Cl.
CPC ..... H04W 74/0816 (2013.01); H04W 74/008 (2013.01); H04W 76/18 (2018.02); H04W 76/19 (2018.02); H04W 80/02 (2013.01)

(58) Field of Classification Search
CPC ... H04B 7/0695; H04B 7/088; H04W 74/004; H04W 74/008; H04W 74/0808; H04W 74/0816; H04W 76/18; H04W 76/19; H04W 80/02
See application file for complete search history.

(56) References Cited

U.S. PATENT DOCUMENTS

| 2018/0242276 A1* | 8/2018 | Patel | H04W 68/02 |
|---|---|---|---|
| 2019/0150198 A1* | 5/2019 | Sun | H04L 5/0032 370/329 |
| 2019/0373635 A1 | 12/2019 | Yang et al. | |

(Continued)

FOREIGN PATENT DOCUMENTS

| WO | WO-2019217880 A1 | 11/2019 |
|---|---|---|
| WO | WO-2020159726 A1 | 8/2020 |

OTHER PUBLICATIONS

International Search Report and Written Opinion—PCT/US2022/070336—ISA/EPO—dated May 20, 2022.

(Continued)

*Primary Examiner* — Kashif Siddiqui
(74) *Attorney, Agent, or Firm* — Norton Rose Fulbright LLP

(57) ABSTRACT

This disclosure provides systems, methods, and devices for wireless communication that support beam specific channel sensing. In a first aspect, a method of wireless communication includes performing a channel sensing operation prior to transmitting a first transmission via a first particular beam of a plurality of beams. The method also includes determining a beam specific channel sensing failure for the particular beam based on performing the channel sensing operation. The method further includes transmitting channel sensing failure information indicating a channel sensing failure for the particular beam and based on the beam specific channel sensing failure and one or more previous beam specific channel sensing failures. Other aspects and features are also claimed and described.

30 Claims, 10 Drawing Sheets

(56) References Cited

U.S. PATENT DOCUMENTS

2021/0203400 A1* 7/2021 Babaei .................. H04W 80/02
2021/0234601 A1* 7/2021 Awadin ................. H04L 5/0048
2022/0085862 A1* 3/2022 Kung .................... H04L 1/1819

OTHER PUBLICATIONS

Lenovo, et al., "Channel Access Mechanisms for NR from 52.6 GHz to 71 GHz", 3GPP TSG RAN WG1 #104-e, R1-2100062, vol. RAN WG1, No. e-meeting, Jan. 25, 2021-Feb. 5, 2021, Jan. 18, 2021, XP051970234, 16 Pages.

* cited by examiner

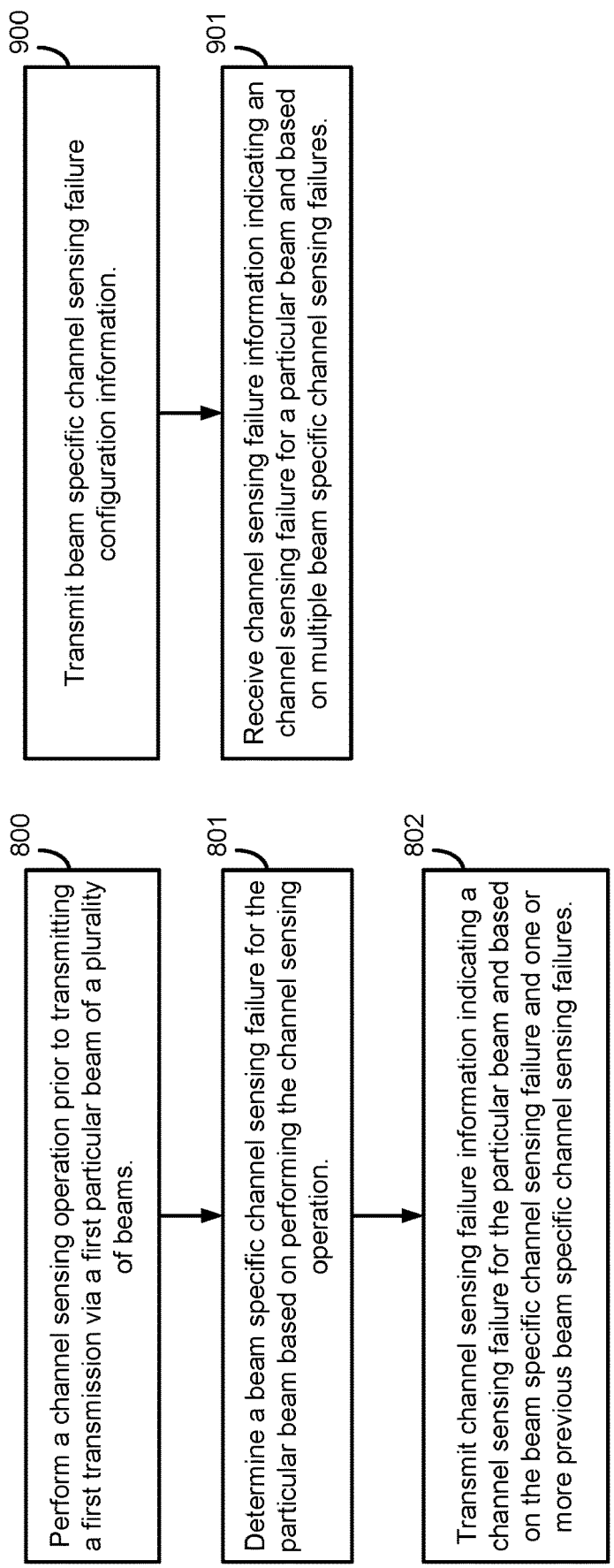

BEAM SPECIFIC CHANNEL SENSING FAILURE

TECHNICAL FIELD

Aspects of the present disclosure relate generally to wireless communication systems, and more particularly, to beam specific channel sensing operations. Some features may enable and provide improved communications, including enhanced channel sensing failure detection, reporting, and recovery.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes performing, by a wireless communication device, a channel sensing operation prior to transmitting a first transmission via a first particular beam of a plurality of beams. The method also includes determining, by the wireless communication device, a beam specific channel sensing failure for the particular beam based on performing the channel sensing operation. The method further includes transmitting, by the wireless communication device, channel sensing failure information indicating a channel sensing failure for the particular beam and based on the beam specific channel sensing failure and one or more previous beam specific channel sensing failures.

In an additional aspect of the disclosure, an apparatus configured for wireless communication is disclosed. The apparatus includes at least one processor, and a memory coupled to the at least one processor. The at least one processor is configured to perform, by a wireless communication device, a channel sensing operation prior to transmitting a first transmission via a first particular beam of a plurality of beams. The at least one processor is also configured to determine, by the wireless communication device, a beam specific channel sensing failure for the particular beam based on performing the channel sensing operation. The at least one processor is further configured to transmit, by the wireless communication device, channel sensing failure information indicating a channel sensing failure for the particular beam and based on the beam specific channel sensing failure and one or more previous beam specific channel sensing failures.

In an additional aspect of the disclosure, an apparatus configured for wireless communication is disclosed. The apparatus includes means for performing, by a wireless communication device, a channel sensing operation prior to transmitting a first transmission via a first particular beam of a plurality of beams. The apparatus also includes means for determining, by the wireless communication device, a beam specific channel sensing failure for the particular beam based on performing the channel sensing operation. The apparatus further includes means for transmitting, by the wireless communication device, channel sensing failure information indicating a channel sensing failure for the particular beam and based on the beam specific channel sensing failure and one or more previous beam specific channel sensing failures.

In an additional aspect of the disclosure, a non-transitory computer-readable medium stores instructions that, when executed by a processor, cause the processor to perform operations including performing, by a wireless communication device, a channel sensing operation prior to transmitting a first transmission via a first particular beam of a plurality of beams. The operations also include determining, by the wireless communication device, a beam specific channel sensing failure for the particular beam based on performing the channel sensing operation. The operations further include transmitting, by the wireless communication device, channel sensing failure information indicating a channel sensing failure for the particular beam and based on the beam specific channel sensing failure and one or more previous beam specific channel sensing failures.

In an additional aspect of the disclosure, a method of wireless communication includes transmitting, by a wireless communication device, beam specific channel sensing failure configuration information. The method further includes receiving, by the wireless communication device, channel sensing failure information indicating an channel sensing failure for a particular beam and based on multiple beam specific channel sensing failures.

In an additional aspect of the disclosure, an apparatus configured for wireless communication is disclosed. The apparatus includes at least one processor, and a memory coupled to the at least one processor. The at least one processor is configured to transmit, by a wireless communication device, beam specific channel sensing failure configuration information. The at least one processor is further configured to receive, by the wireless communication device, channel sensing failure information indicating an channel sensing failure for a particular beam and based on multiple beam specific channel sensing failures.

In an additional aspect of the disclosure, an apparatus configured for wireless communication is disclosed. The apparatus includes means for transmitting, by a wireless communication device, beam specific channel sensing failure configuration information. The apparatus further includes means for receiving, by the wireless communication device, channel sensing failure information indicating an channel sensing failure for a particular beam and based on multiple beam specific channel sensing failures.

In an additional aspect of the disclosure, a non-transitory computer-readable medium stores instructions that, when executed by a processor, cause the processor to perform operations including transmitting, by a wireless communication device, beam specific channel sensing failure configuration information. The operations further include receiving, by the wireless communication device, channel sensing failure information indicating an channel sensing failure for a particular beam and based on multiple beam specific channel sensing failures.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 8 is a flow diagram illustrating an example process that supports use of beam specific channel sensing operations according to one or more aspects.

FIG. 9 is a flow diagram illustrating an example process that supports use of beam specific channel sensing operations according to one or more aspects.

Like reference numbers and designations in the various drawings indicate like elements.

DETAILED DESCRIPTION

Figure 1:
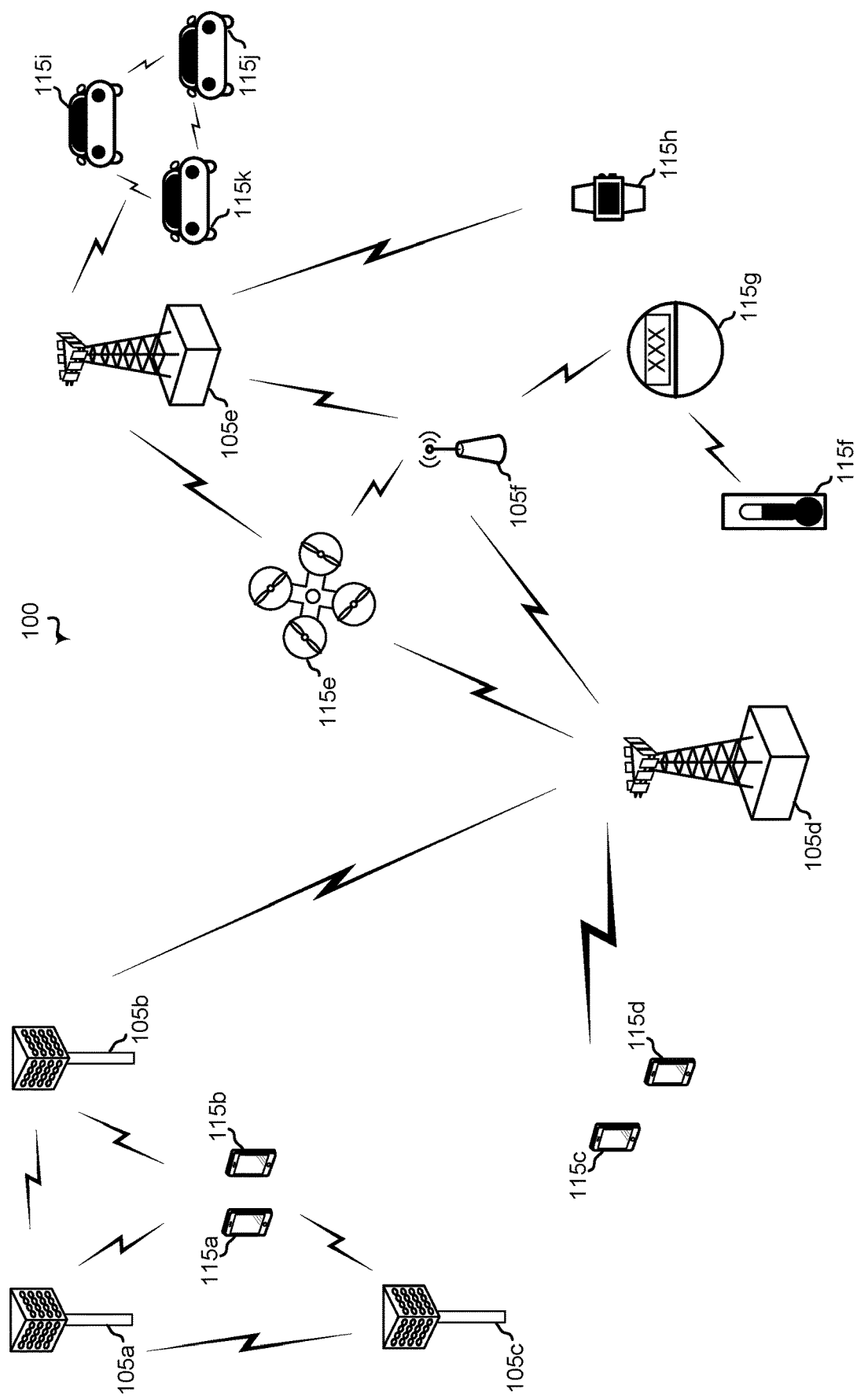
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards. A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail device or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspect. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
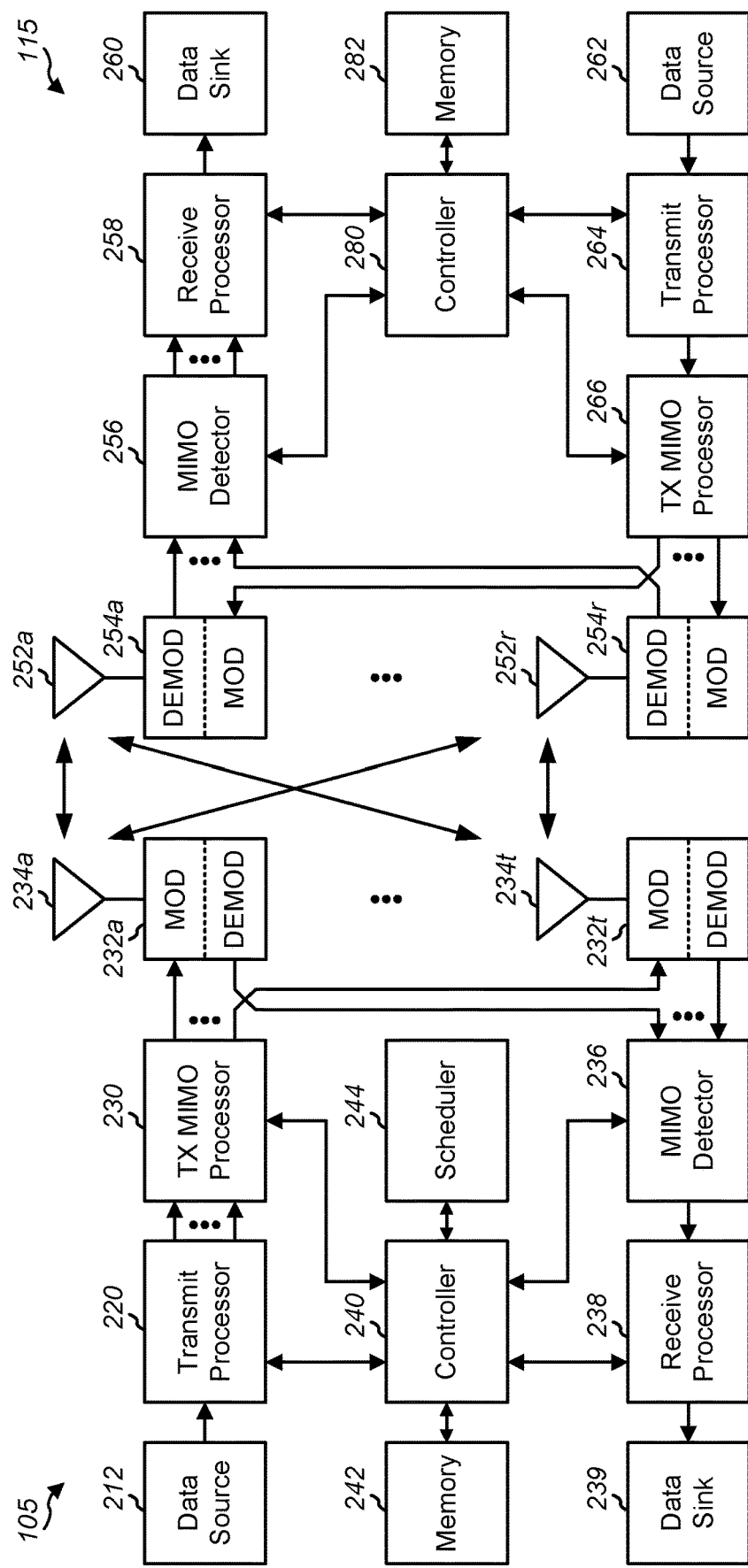
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 8 and 9, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
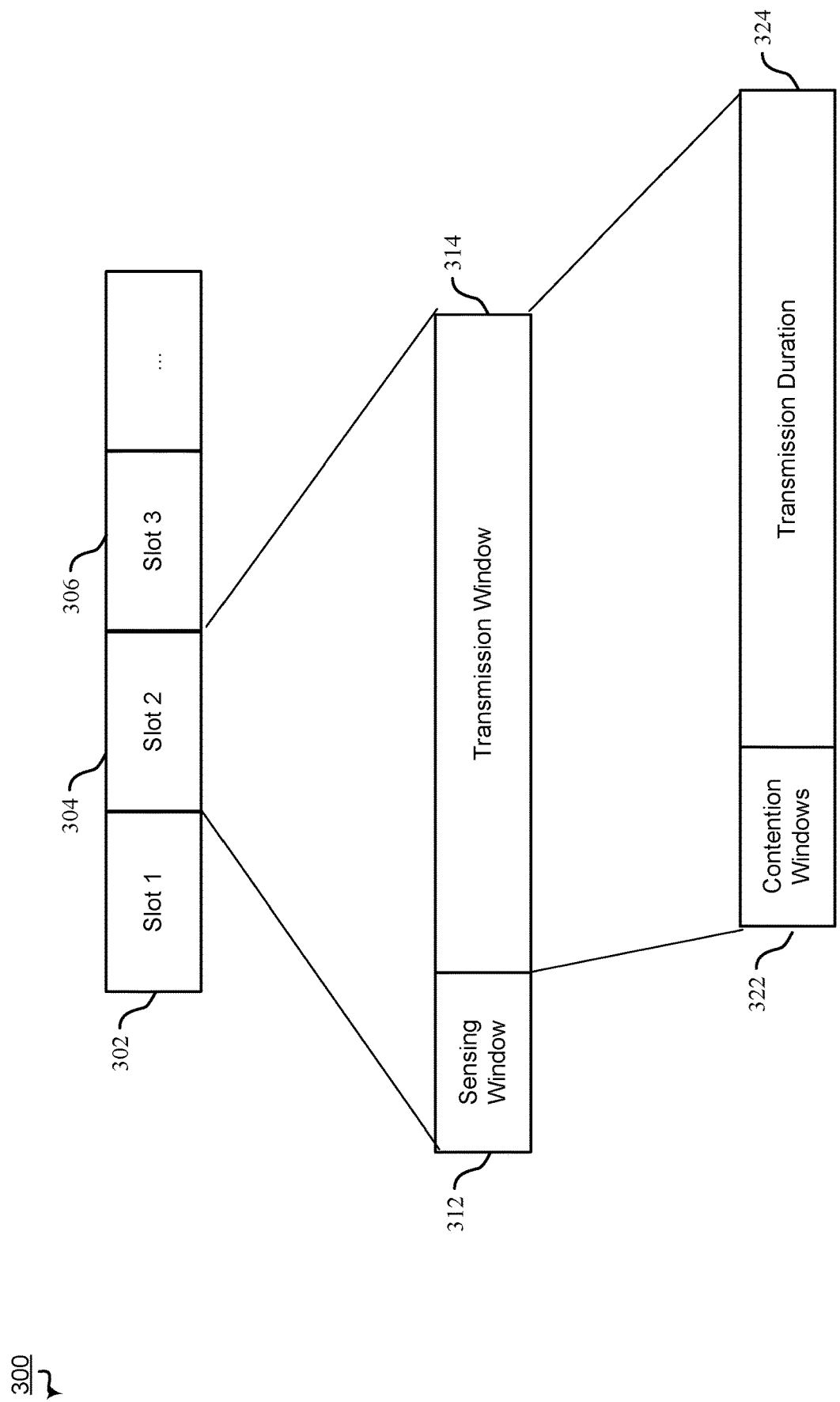
FIG. 3 is a diagram illustrating an example of channel sensing operations.

FIG. 3 illustrates an example diagram illustrating channel sensing timing. In FIG. 3, a plurality of slots of a frame are shown. Specifically, FIG. 3 depicts a first slot 302, a second slot 304, a third slot 306, and one or more other slots. A slot, such as the second slot 304, may include or be broken into windows, such as a sensing window 312 and a transmission window 314. The sensing window 312 may include a period of time (duration) where devices listen for signals/indications of devices which intend to transmit in the corresponding transmission window 314. For example, sensing window 312 may include a period of time for LBT operations.

In some implementations, a transmission window, such as transmission window 314, may further include a contention window 322. The contention window 324 may be for additional medium contention procedures if multiple devices attempted to secure the transmission window 314. The remaining portion or duration of the transmission window 314 is the transmission duration 324 for which a device may transmit data.

In some operations, such as when operating in unlicensed spectrum, a wireless communication device (e.g., UE or BS) may have to perform channel sensing (e.g., LBT) prior to its transmission. Such channel sensing may reduce or prevent collisions and enable coexistence with other unlicensed nodes. In some such operations, the wireless communication device may only transmit with a channel sensing success, such as a successfully performing a LBT operation.

If a channel sensing failures occur consistently on the link (e.g., uplink, downlink, or sidelink), it is beneficial to stop further transmission attempts on this cell and take further action, such as by changing the cell. Existing unlicensed and/or NR licensed recovery mechanisms, such as operations. based on Radio Link Control Acknowledge Mode (RLC AM) maximum number of attempts, can be too slow or may not happen.

As a partial solution to such issues, a new mechanism to detect and recover from consistent uplink (UL) LBT failures was introduced in Release 16 New Radio Unlicensed (R16 NR-U). The detection is per Bandwidth Part (BWP) and is based on all uplink transmissions within this BWP. In such operations, all uplink transmission attempts are treated equally irrespective of physical channel, LBT type, and cell association and power control (CAPC) used. For each UL transmission attempt, the physical (PHY) layer will indicate to the Medium Access Control (MAC) layer whether there was a LBT failure. The detection mechanism uses a timer and a counter (similar to BFD and BFR). For example, the parameters of lbt-FailureDetectionTimer and lbt-FailureInstanceMaxCount may be configured by RRC for these variables.

The timer is re-started with every LBT failure indication. The counter is incremented with every LBT failure and is reset when the timer expires (e.g., when the timer reaches lbt-FailureDetectionTimer). When the counter exceeds the configured threshold (lbt-FailureInstanceMaxCount), consistent UL LBT failure is declared on this particular BWP.

After LBT failure is declared for the BWP, certain reporting and/or recovery operations may be initiated. Such operations may include recovery on Secondary Cell (SCell) or recovery on special cell (SpCell). A SpCell may be a Primary Cell (PCell) or a Primary Secondary Cell (PSCell). The PCell may be a SpCell of a master cell group (MCG) and the PSCell may be SpCell of a secondary cell group (SCG). For recovery on SCell, when consistent uplink LBT failures are detected on an SCell or SCell(s), the UE reports this to the corresponding gNB (master node (MN) for MCG, secondary node (SN) for SCG) via a MAC CE. The report is sent on a different serving cell than the SCell(s) where the failures were detected. If no resources are available to transmit the MAC CE, a Scheduling Request (SR) can be transmitted by the UE.

For recovery on SpCell (PCell or PSCell), when consistent uplink LBT failures are detected on SpCell, the UE switches to another UL BWP (which is configured with Random Access Channel (RACH) resources on that cell), initiates RACH procedures, and then reports the failure via a MAC Control Element (CE, MAC CE). When multiple UL BWPs are available for switching, a UE may determine which one to select based on one or more criteria.

For recovery on a PSCell, if consistent uplink LBT failures are detected on all the UL BWPs that are configured with RACH resources, the UE declares SCG Radio Link Failure (RLF) and reports the failure to the MN via SCGFailureInformation. Alternatively, for recovery on a PCell, if the uplink LBT failures are detected on all the UL BWP(s) that are configured with RACH resources, the UE declares RLF.

In such implementations, the MAC CE for reporting UL LBT problems has a higher priority than data, but lower priority than the BFR MAC CE. The MAC CE includes a bitmap to indicate if a corresponding serving cell has declared consistent LBT failure. When consistent UL LBT failure is declared on SpCell, a MAC CE is sent on the BWP that the UE switched to during RACH procedure.

A new failure type for PSCell consistent UL LBT failure was added in the SCGFailureInformation. However, no new re-establishment cause is introduced in the RRC re-establishment message, and the "other" failure will be used to indicate.

One SR configuration (SR id) is configured for SRs triggered by UL LBT failure detection on SCell, which can be shared with other logical channels (LCHs). A RACH operation is triggered if this SR config id is not configured.

A UE shall stop any ongoing Random Access (RA) procedure and initiate a new RA procedure after BWP switching caused by LBT failure detection on SpCell. The UE cancels all UL LBT failures triggered for a SCell upon deactivation of the SCell; the UE cancels triggered UL LBT failures, if any, upon MAC reset affecting the corresponding serving cell.

In Release 17 (R17), the NR-U operation is being extended to the mmWave band (e.g., 60 GHz unlicensed spectrum, 37 GHz shared spectrum, etc.). Analog beamforming is typically used in mmWave bands to increase the coverage with lots of antenna elements and to reduce the cost with limited numbers of digital chains. With beamforming operations, it is possible that some beams (and their corresponding directions) experience persistent LBT failure, while other beams may not suffer from persistent LBT failure. Accordingly, previous LBT operations may prematurely declare failure for all beams and thus may declare failure for multiple beams which are not suffering from persistent LBT failure.

Therefore, it is beneficial to consider beam specific channel sensing failure detection, recovery, and reporting in for beamforming capable systems. Such design can be equally applicable for both Uu and PC5 communications. Uu communications are communications which use the Uu logical interface and are between a base station and wireless device (e.g., UE). PC5 communications are communications which use the PC5 interface and are one type of Vehicle-to-everything (V2X) communications. Such PC5 communication can be between two devices or nodes and independent of a host (e.g., base station, network device, access point, etc.). Thus, beam specific channel sensing can be extended from traditional UE and base station communications to device-to-device (D2D) communications.

In the aspects described herein, beam specific channel sensing failure detection, reporting, and recovery operations are provided to enable enhanced operation in beam based operations. The channel sensing operations may be time based, energy based, or both. For a particular beam, a corresponding counter and timer may be configured to monitor channel sensing operations for the particular beam. For example, the parameters lbt-FailureDetectionTimer and lbt-FailureInstanceMaxCount may be programed or configured, such as by RRC. The timer is reset or restarted with every LBT failure indication for the beam, and the counter is incremented with every LBT failure and is reset when the timer expires (e.g., when the timer reaches lbt-FailureDetectionTimer) for the beam.

When the counter exceeds the configured threshold (e.g., lbt-FailureInstanceMaxCount), persistent/consistent channel sensing failure is declared for the particular beam on this BWP. The parameters lbt-FailureDetectionTimer and lbt-FailureInstanceMaxCount can be the same or different for different beams or groups of beams.

For some beams, if the network (e.g., gNB) does not have scheduled or pre-configured uplink transmissions, the gNB may also configure virtual transmission opportunities for the UE to perform channel sensing failure detection. The UE may perform channel sensing on the virtual transmission opportunities to test the beam for congestion. However, as compared to actual transmission opportunities (TXOPs), the UE will not transmit upon channel sensing success for the virtual transmission opportunities. Thus, the network may enable the UE to test beams when spectrum is available and proactively reduce or prevent channel sensing failures for actual data transmissions, which reduces latency and increases throughput.

In some implementations, persistent channel sensing failures are only declared when all beams (or all beams of one or more groups) experience persistent channel sensing failure. In such implementations, the subsequent procedure can follow R16 NR-U operations. To illustrate, when persistent channel sensing failures are detected for all beams or all groups of beams, the R16 NR-U procedures may be used.

In other implementations, persistent channel sensing failures are declared per beam or per group of beams. In such implementations, partial channel sensing failure detection and recovery may be considered. With partial LBT failure detection and recovery, the UE can report the partial channel sensing failures to gNB via a MAC CE or via a L1 channel (e.g., PUCCH). When persistent channel sensing failures are declared for a beam or a group of beams, the UE can report this to gNB via one or more other beams or via one or more other group of beams. If the partial channel sensing failures are detected on Scell(s), the UE can also report such failures on a different serving cell than the Scell(s) where the failures were detected.

The beam specific channel sensing (e.g., LBT) failure detection, recovery, and reporting may be further extended from Uu to PC5 communications. For example, it is possible to extend the PC5-UL LBT failure detection, recovery, and reporting to be beam specific. For a particular PC5 link, different configuration can be applied to different beams. The channel sensing (e.g., LBT) failure can be declared when all beams experience channel sensing failures or a partial channel sensing failure can be declared with a beam or a group of beams experience channel sensing failure.

For mode 1 PC5 (where all transmissions and configuration are done by the gNB), LBT failure detection and configuration parameters for each beam are configured by the gNB. For mode 2 PC5 (which can work without gNB involvement), LBT failure detection and configuration parameters for each beam can be specified or pre-configured or suggested by the receiver.

The partial LBT failure declaration is also configured by gNB in mode 1 or via specification/pre-configuration/receiver recommendation in mode 2. With partial LBT failure detection for a group of beams, one node can indicate the LBT failure to another node via other beams which do not experience LBT failure. The indication can be sent in MAC CE in PSSCH or via enhanced PSFCH or via enhanced sidelink control information. In mode 1 PC5, the node can also send partial LBT failure report to gNB.

Figure 4:
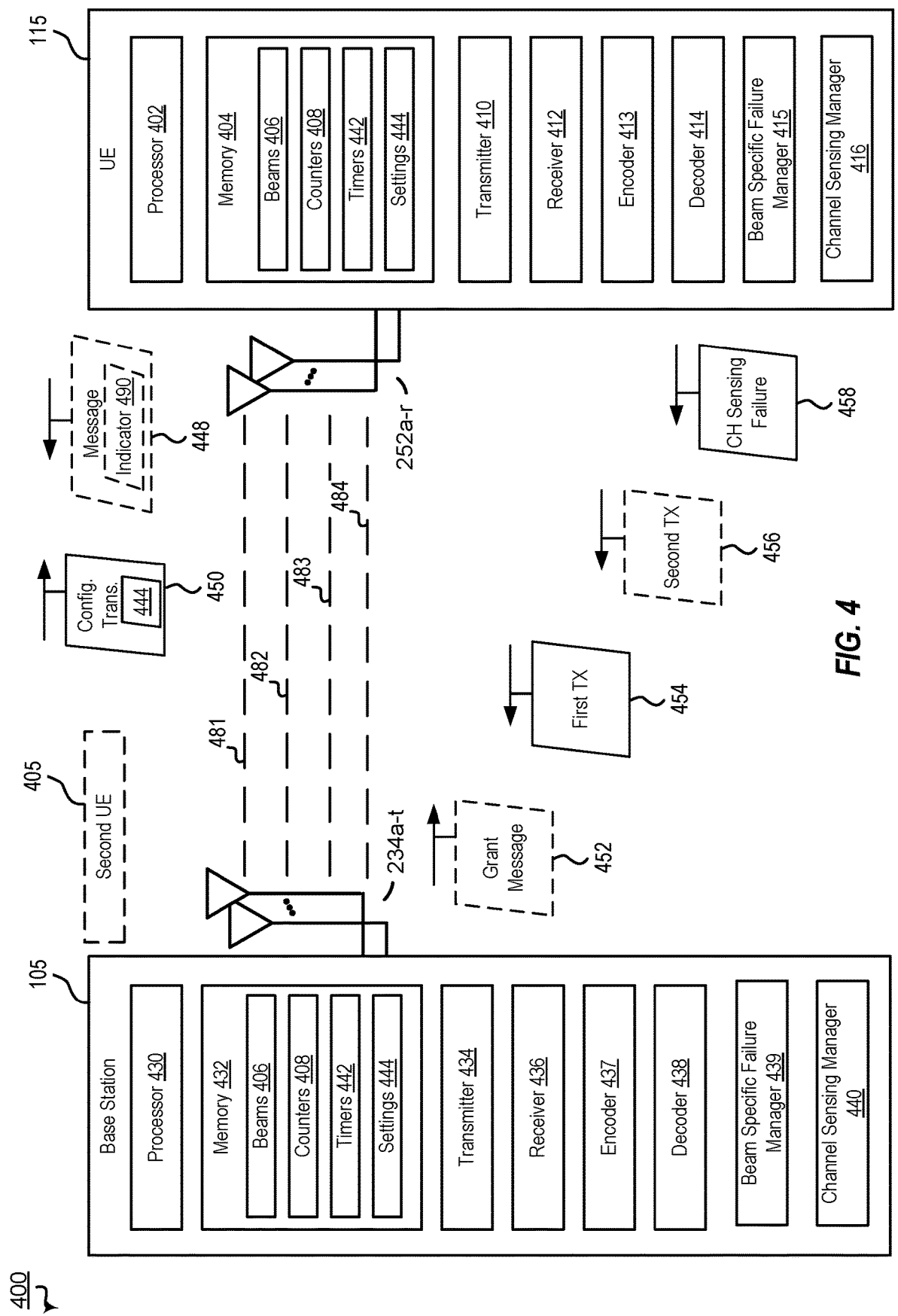
FIG. 4 is a block diagram illustrating an example wireless communication system that supports use of beam specific channel sensing operations according to one or more aspects.

FIG. 4 illustrates an example of a wireless communications system 400 that supports beam specific channel sensing failure operations in accordance with aspects of the present disclosure. In some examples, wireless communications system 400 may implement aspects of wireless communication system 100. For example, wireless communications system 400 may include multiple wireless communication devices and optionally a network entity. In the example of FIG. 4, the wireless communications system 400 includes a base station 105, a UE 115, and optionally a second UE. Use of beam specific channel sensing failure may reduce latency and increase throughput by increasing channel sensing failure detection, reporting and recovery effectiveness. Thus, network and device performance can be increased.

UE 115 and base station 105 may be configured to communicate via frequency bands, such as FR1 having a frequency of 410 to 7125 MHz, FR2 having a frequency of 24250 to 52600 MHz for mm-Wave, and/or one or more other frequency bands. It is noted that Sub-carrier spacing (SCS) may be equal to 15, 30, 60, or 120 kHz for some data channels. UE 115 and base station 105 may be configured to communicate via one or more component carriers (CCs), such as representative first CC 481, second CC 482, third CC 483, and fourth CC 484. Although four CCs are shown, this is for illustration only, more or fewer than four CCs may be used. One or more CCs may be used to communicate control channel transmissions, data channel transmissions, and/or sidelink channel transmissions.

Such transmissions may include a Physical Downlink Control Channel (PDCCH), a Physical Downlink Shared Channel (PDSCH), a Physical Uplink Control Channel (PUCCH), a Physical Uplink Shared Channel (PUSCH), a Physical Sidelink Control Channel (PSCCH), a Physical Sidelink Shared Channel (PSSCH), or a Physical Sidelink Feedback Channel (PSFCH). Such transmissions may be scheduled by aperiodic grants and/or periodic grants.

Each periodic grant may have a corresponding configuration, such as configuration parameters/settings. The periodic grant configuration may include configured grant (CG) configurations and settings. Additionally, or alternatively, one or more periodic grants (e.g., CGs thereof) may have or be assigned to a CC ID, such as intended CC ID.

Each CC may have a corresponding configuration, such as configuration parameters/settings. The configuration may include bandwidth, bandwidth part, HARQ process, TCI state, RS, control channel resources, data channel resources, or a combination thereof. Additionally, or alternatively, one or more CCs may have or be assigned to a Cell ID, a Bandwidth Part (BWP) ID, or both. The Cell ID may include a unique cell ID for the CC, a virtual Cell ID, or a particular Cell ID of a particular CC of the plurality of CCs. Additionally, or alternatively, one or more CCs may have or be assigned to a HARQ ID. Each CC may also have corresponding management functionalities, such as, beam management, BWP switching functionality, or both. In some implementations, two or more CCs are quasi co-located, such that the CCs have the same beam and/or same symbol.

In some implementations, control information may be communicated via UE 115 and base station 105. For example, the control information may be communicated using MAC CE transmissions, RRC transmissions, SCI (sidelink control information), transmissions, another transmission, or a combination thereof.

UE 115, and optionally second UE 405, can include a variety of components (e.g., structural, hardware components) used for carrying out one or more functions described herein. For example, these components can includes processor 402, memory 404, transmitter 410, receiver 412, encoder, 413, decoder 414, beam specific failure manager 415, channel sensing manager 416, and antennas 252a-r. Processor 402 may be configured to execute instructions stored at memory 404 to perform the operations described herein. In some implementations, processor 402 includes or corresponds to controller/processor 280, and memory 404 includes or corresponds to memory 282. Memory 404 may also be configured to store beam data 406, counter data 408, timer data 442, settings data 444, or a combination thereof, as further described herein.

The beam data 406 includes or corresponds to data associated with or corresponding to one or more beams of a plurality of beams. For example, the beam data 406 may indicate one or more beams for an active BWP. The beam data 406 may further include data identifying beam groups and/or beam priority. The beam data 406 may include parameters for beam specific failure operations, such a determining, reporting, and recovery.

The counter data 408 includes or corresponds to data associated with beam specific channel sensing failure counters for enhanced beam specific channel sensing failure operations. The beam specific failure counters enable counting beam specific failures for persistent failure determination. For example, when a counter or counters satisfy a condition, a persistent failure for the beam, group of beams, or all beams is reported. The counter data 442 may include a corresponding counter for each beam of the plurality of beam of the beam data 406. Alternatively, the counter data 408 may include a corresponding counter for a subset of beam of the plurality of beams, such as one counter for each group of beams or corresponding counters for each beam of a single beam group (e.g., primary beams).

The timer data 442 includes or corresponds to data associated with beam specific channel sensing failure timers for enhanced beam specific channel sensing failure operations. The beam specific failure timers enable counting beam specific failures for persistent failure determination. For example, a beam specific failure timer may be used to control abeam specific failure counter. To illustrate, when the timer or timers satisfy a condition, a persistent counter may be adjusted (e.g. reset). In this way, the timer can ensure the persistent beam failure is only determined when all of the failures tracked by the counter happened within a particular timer period. Even though, the timer is tracking time, the timer may use units of transmission to ensure that all such tracked failures are recent/relevant. The timer data 442 may include a corresponding timer for each beam of the plurality of beam of the beam data 406. Alternatively, the timer data 442 may include a corresponding timer for a subset of beam of the plurality of beams, such as 1 timer for each group of beams or corresponding timers for each beam of a single beam group (e.g., primary beams).

The settings data 444 includes or corresponds to data associated with beam specific channel sensing failure operations. The settings data 444 may include settings and/or conditions data for determination, recording, or recovery, operations for beam specific channel sensing failure. The settings data 444 may include mode data, such as certain parameters or threshold to use based on an operating mode. For example, the settings may include parameters from when operating in an unlicensed spectrum mode, when operating with a SCell, when operating with a PSCell, or a combination thereof. Such settings and/or parameters for beam specific channel sensing feedback may include beam groups, counter parameters, timer parameters, thresholds, conditions, mode etc.

For example, the mode may indicate partial beam specific failure or full beam specific failure. When partial beam specific failure is used, the mode may indicate per beam or per group.

Transmitter 410 is configured to transmit data to one or more other devices, and receiver 412 is configured to receive data from one or more other devices. For example, transmitter 410 may transmit data, and receiver 412 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 410 and receiver 412 may be replaced with a transceiver. Additionally, or alternatively, transmitter 410, receiver, 412, or both may include or correspond to one or more components of UE 115 described with reference to FIG. 2.

Encoder 413 and decoder 414 may be configured to encode and decode data for transmission. Beam specific failure manager 415 may be configured to determine and perform beam specific failure operations. For example, beam specific failure manager 415 is configured to performed beam specific failure determination, reporting, and/or recovery operations. As an illustrative example of determination operations, the beam specific failure manger 415 may adjust or generate beam data 406, counter data 408 (beam specific counters), and timer data 442 (beam, specific timers). To illustrate, beam specific failure manger 415 may increment a beam specific failure counter and compare the beam specific failure counter to a threshold, adjust a beam specific failure timer based on elapsed time or transmissions, reset the beam specific failure counter based on the beam specific failure timer, etc. As an illustrative example of reporting operations, the beam specific failure manager 415 may determine when to report (e.g., after one persistent beam specific failure or multiple, which device to report to, and how to report the failure or failures. As an illustrative example of recovery operations, the beam specific failure manager 415 may determine which recovery procedures to initiate and with whom to initiate them.

Channel sensing manager 416 may be configured to determine and perform channel sensing operations. For example, channel sensing manager 416 is configured to determine what channel sensing operation to perform. As another example, the channel sensing manager 416 is configured to determine if the channel sensing operation was successful or unsuccessful.

Base station 105 includes processor 430, memory 432, transmitter 434, receiver 436, encoder 437, decoder 438, beam specific failure manager 439, channel sensing manager 440, and antennas 234*a-t*. Processor 430 may be configured to execute instructions stores at memory 432 to perform the operations described herein. In some implementations, processor 430 includes or corresponds to controller/processor 240, and memory 432 includes or corresponds to memory 242. Memory 432 may be configured to beam data 406, counter data 408, timer data 442, settings data 444, or a combination thereof, similar to the UE 115 and as further described herein.

Transmitter 434 is configured to transmit data to one or more other devices, and receiver 436 is configured to receive data from one or more other devices. For example, transmitter 434 may transmit data, and receiver 436 may receive data, via a network, such as a wired network, a wireless network, or a combination thereof. For example, base station 105 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 434 and receiver 436 may be replaced with a transceiver. Additionally, or alternatively, transmitter 434, receiver, 436, or both may include or correspond to one or more components of base station 105 described with reference to FIG. 2.

Encoder 437, and decoder 438 may include the same functionality as described with reference to encoder 413 and decoder 414, respectively. Beam specific failure manager 439 may include similar functionality as described with reference to beam specific failure manager 415. Channel sensing manager 440 may include similar functionality as described with reference to channel sensing manager 416.

During operation of wireless communications system 400, base station 105 may determine that UE 115 has enhanced channel sensing failure capability. For example, base station 105 may transmit a message 448 that includes a beam specific channel sensing failure operation indicator 490 (e.g., a beam specific channel sensing failure for NR-U operation). Indicator 490 may indicate enhanced beam specific channel sensing failure operations or a particular type or mode of beam specific channel sensing failure. In some implementations, a base station 105 sends control information to indicate to UE 115 that enhanced beam specific channel sensing failure operations and/or a particular type of enhanced beam specific channel sensing failure operations. For example, in some implementations, message 448 (or another message, such as configuration transmission 450) is transmitted by the base station 105 or the network entity 405. The configuration transmission 450 may include or indicate to use enhanced beam specific channel sensing failure operations or to adjust or implement a setting of a particular type of enhanced beam specific channel sensing failure operations. For example, the configuration transmission 450 may include 444, as indicated in the example of FIG. 4, 442, or both.

During operation, devices of wireless communications system 400, perform enhanced beam specific channel sensing failure operations for contended or unlicensed spectrum. For example, the wireless communication devices (e.g., a base station and UE) exchange transmissions via a downlink or uplink channel in NR-U. Alternatively, wireless communication devices (e.g., two UEs) exchange transmissions via a sidelink channel. In the example of FIG. 4, the base station 105 optionally transmits an uplink grant message 452 to the UE 115. The uplink grant message 452 may include or indicate one or more uplink grant instances for the UE 115.

In some implementations, the uplink grant message 452 may include or indicate one or more virtual grant instances for the UE 115. Such virtual grant instances and corresponding virtual transmit opportunities may include occasions for the UE 115 to perform channel sensing operations to test a beam even though the UE 115 does not have data to transmit or has no intention of transmitting at the particular time.

The UE 115 may receive the uplink grant message 452 and may determine the one or more uplink grant instances indicated by the base station 105. The UE 115 may optionally determine if it has data to send and if it will attempt to use the particular resource or resources reserved by the base station 105 for uplink transmission. The UE 115 may then attempt to transmit during the particular transmission resource for a particular uplink grant instance. The UE 115 performs a channel sensing operation to secure the medium and transmit a first transmission 454. In response to a successful channel sensing operation, such as a successful LBT operation, the UE 115 transmits the first transmission 454. Alternatively, in response to an unsuccessful channel sensing operation, the UE 115 does not transmit the first transmission 454.

Additionally, in response to either a successful channel sensing operation or an unsuccessful channel sensing operation, the UE 115 may adjust the counter or timer for the particular beam. Additional beam specific counter and timer adjustment details are described further with reference to FIG. 7.

The UE 115 may then attempt to transmit during a second particular transmission resource for a second particular uplink grant instance. The UE 115 performs a second channel sensing operation to secure the medium and transmit a second transmission 454. In response to a successful channel sensing operation, such as a successful LBT operation, the UE 115 transmits the second transmission 456. Alternatively, in response to an unsuccessful channel sensing operation, the UE 115 does not transmit the second transmission 456.

Similarly, in response to either a successful second channel sensing operation or an unsuccessful second channel sensing operation, the UE 115 may adjust the counter or timer for the particular beam. When the counter satisfies a condition, the UE 115 may report a beam specific failure for the particular beam, that is a partial beam specific failure. For example, the UE 115 may send the report message 458 to the base station 105 via a second beam. Additionally, or alternatively, the UE 115 sends the report message 458 or a second report message to a second network entity.

In other implementations, the UE 115 may switch beams and continue to attempt to send data via the second beam. The UE 115 may similarly perform channel sensing operations and adjust a second counter and timer for the second beam and one or more other beams. After all such available or configured beams, such as all beams for a particular BWP, the UE 115 may then report beam specific failure for all beams.

Accordingly, the UE 115 and base station 105 may be able to more effectively perform beam specific failure operations. Thus, FIG. 4 describes enhanced beam specific failure operations for wireless communication devices. Using enhanced beam specific failure operations may enable improvements when devices are operating in contested spectrum. Performing enhanced beam specific failure operations enables increased beam specific failure detection, reporting, and recovery and thus, enhanced UE and network performance by increasing throughput and reducing errors and latency.

Figure 5:
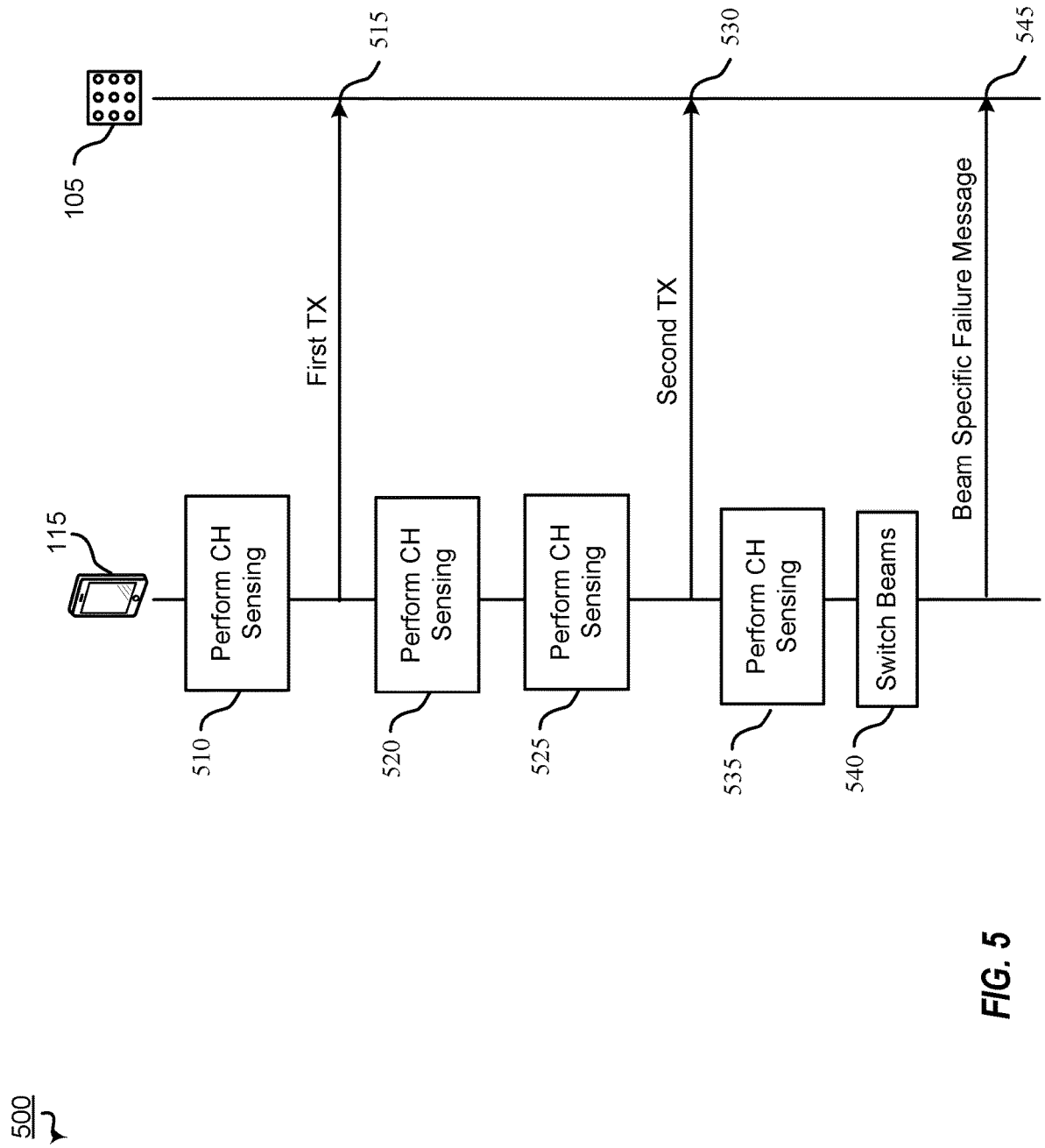
FIG. 5 is a ladder diagram illustrating an example wireless communication system that supports use of beam specific channel sensing operations according to one or more aspects.
Figure 6:
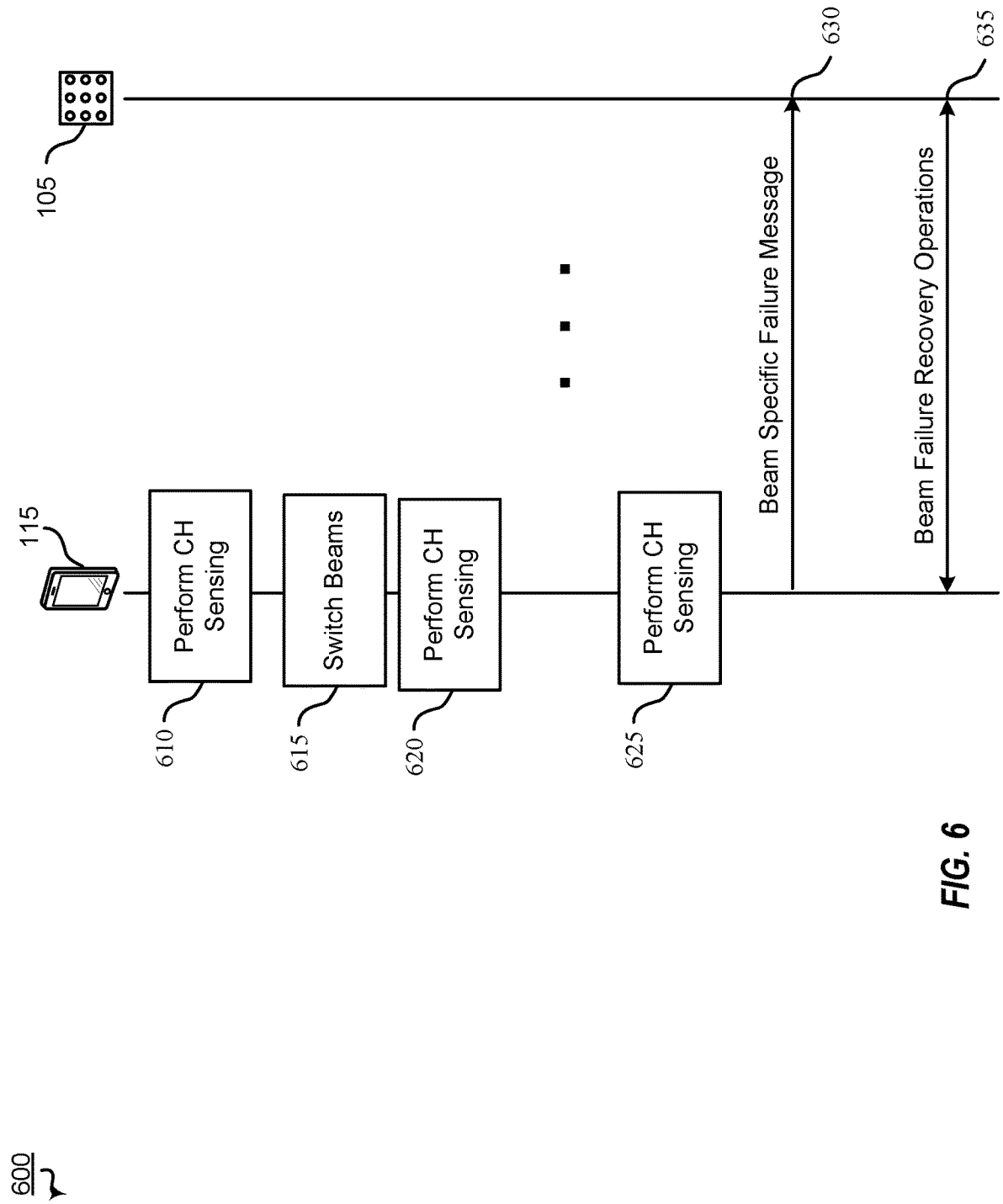
FIG. 6 is a ladder diagram illustrating an example wireless communication system that supports use of beam specific channel sensing operations according to one or more aspects.

FIGS. 5 and 6 illustrate examples of ladder diagrams for beam specific channel sensing failure operations according to some aspects. Referring to FIG. 5, FIG. 5 is a ladder diagram 500 of beam specific channel sensing failure operations for partial beam specific failure reporting and recovery according to some aspects. In the example of FIG. 5, the ladder diagram illustrates a UE 115 and a network entity, such as base station 105. The diagram is simplified for illustration and explanation. In practice, many UEs may be connected to the network entity, and optionally, some UEs may be connected to multiple network entities and/or other UEs.

At 510, the UE 115 performs a channel sensing operation for a particular beam, such as a first beam. For example, the UE 115 monitors for signals with a corresponding receive beam, that monitors for signals from a particular direction associated with the first beam. Responsive to a channel sensing success, the UE 115 may transmit data via the first beam. Responsive to a channel sensing failure, the UE 115 may not transmit data and may adjust a corresponding beam specific failure counter and/or timer for the first beam, such as illustrated and described further with reference to FIG. 7.

At 515, the UE 115 transmits a first transmission via the first beam responsive to a successful channel sensing operation for the first beam at 510. For example, the UE 115 transmits a first data transmission via the first beam. The UE 115 may adjust the adjust the beam specific counter and/or timer. For example, the UE may increment or decrement the timer to indicate another transmission has occurred without a failure. In such implementations, the timer may control resetting of the counter. Alternatively, if the channel sensing operation was for a virtual grant or transmission opportunity, the UE 115 would not transmit a first transmission as it was just using the channel sensing operation to test the beam and either had no data to send or no intention of sending data.

At 520, the UE 115 performs a channel sensing operation for the particular beam, such as the first beam. For example, the UE 115 monitors for signals with a corresponding receive beam, that monitors for signals from a particular direction associated with the first beam. Responsive to a channel sensing success, the UE 115 may transmit data via the first beam. Responsive to a channel sensing failure, the UE 115 may not transmit data and may adjust a corresponding beam specific failure counter and/or timer for the first beam, such as illustrated and described further with reference to FIG. 7.

At 525, the UE 115 performs a channel sensing operation for the particular beam, such as the first beam. For example, the UE 115 monitors for signals with a corresponding receive beam, that monitors for signals from a particular direction associated with the first beam. Responsive to a channel sensing success, the UE 115 may transmit data via the first beam. Responsive to a channel sensing failure, the UE 115 may not transmit data and may adjust a corresponding beam specific failure counter and/or timer for the first beam, such as illustrated and described further with reference to FIG. 7.

At 530, the UE 115 transmits a second transmission via the first beam responsive to a successful channel sensing operation for the first beam at 525. For example, the UE 115 transmits a second data transmission via the first beam. The UE 115 may adjust the adjust the beam specific counter and/or timer, as described with reference to 515.

At 535, the UE 115 performs a channel sensing operation for the particular beam, such as the first beam. For example, the UE 115 monitors for signals with a corresponding receive beam, that monitors for signals from a particular direction associated with the first beam. Responsive to a channel sensing success, the UE 115 may transmit data via the first beam. Responsive to a channel sensing failure, the UE 115 may not transmit data and may adjust a corresponding beam specific failure counter and/or timer for the first beam, such as illustrated and described further with reference to FIG. 7.

At 540, the UE 115 switches beams. For example, the UE 115 switches from the first beam to a second beam responsive to determining persistent beam failure for the first beam. To illustrate, the UE 115 may determine that a beam specific counter for the first beam has satisfied a condition set by a standard, a region, or a network to determine persistent beam failure for the first beam.

At 545, the UE 115 generates and transmits a beam specific failure message responsive to determining the persistent beam failure for the first beam. For example, the UE 115 generates channel sensing failure information indicating a channel sensing failure for a single beam (or a subset of beams) based on the beam specific channel sensing failure determinations above. The channel sensing failure information may be sent by a beam (e.g., the second beam) that is different from the beam which experienced the persistent failure (e.g., the first beam). Accordingly, the UE 115 may be able to report this beam specific failure to the entity in which the error occurred. Conventionally, a device would have to report beam failures to a second receiving device, as a persistent failure was occurring between the device and a first receiving device.

The channel sensing failure information may be included in a layer 1 or 2 transmission, such as a MAC CE or a physical layer data or control message, such as a PUSCH or PUCCH when transmitted to from a UE to a base station as in the example of FIG. 5. In other implementations, the UE 115 may transmit the channel sensing failure information to another device in addition to or the alternative of the device associated with the failure (e.g., the base station 105).

At 550, the UE 115 and the base station 105 perform beam failure recovery operations. For example, the UE 115 performs recovery operations with the base station 105. When using partial beam specific channel sensing failure detection and recovery (e.g., operating in an partial beam specific LBT failure mode), the UE 115 can report partial beam specific channel sensing failures to base station 105 via MAC CE or L1 channel (e.g., PUCCH).

If the partial beam specific channel sensing failure was detected on Scell(s), the UE 115 can also report this on a different serving cell than the Scell(s) where the failure(s) were detected. Alternatively, when persistent beam specific channel sensing failures are declared for a group of beams, the UE 115 can report this to the base station 105 via another group of beams (e.g., a particular beam of the group. As yet another illustration, the UE 115 and the base station 105 may perform recovery operations as set forth in Release 15 or 16.

Thus, in the example in FIG. 5, the UE performs beam specific channel sensing failure operations for partial beam reporting and/or recovery. That is, the UE report and attempts to recover for persistent beam failure for a single beam or a subset of beams, that is less than all beams.

Referring to FIG. 6, FIG. 6 is a ladder diagram 600 of beam specific channel sensing failure operations for multiple beams according to some aspects. In the example of FIG. 6, the ladder diagram illustrates a UE 115 and a network entity, such as base station 105. As compared to example of FIG. 5, the beam specific channel sensing failure configuration or indication thereof may indicate failure on multiple (or all) beams in the example of FIG. 6. For example, the beam failure message may indicate failure on a majority or all of the beams of an active BWP.

At 610, the UE 115 performs a channel sensing operation for a particular beam, such as a first beam. For example, the UE 115 monitors for signals with a corresponding receive beam, that monitors for signals from a particular direction associated with the first beam. Responsive to a channel sensing success, the UE 115 may transmit data via the first beam. Responsive to a channel sensing failure, the UE 115 may not transmit data and may adjust a corresponding beam specific failure counter and/or timer for the first beam, such as illustrated and described further with reference to FIG. 7.

At 615, the UE 115 switches beams. For example, the UE 115 switches from the first beam to a second beam responsive to multiple failed channel sensing operations for the first beam. To illustrate, when a beam specific failure counter for the first beam satisfies a condition, such as is equal to a value of a threshold set by the base station 105. As in contrast to FIG. 5, the UE 115 may not send a beam failure recovery message responsive to a single beam encountering a failure, that is a determining persistent failure for a single beam.

At 620, the UE 115 performs a channel sensing operation for a second particular beam, such as the second beam. For example, the UE 115 monitors for signals with a corresponding receive beam, that monitors for signals from a particular direction associated with the second beam. Responsive to a channel sensing success, the UE 115 may transmit data via the second beam. Responsive to a channel sensing failure, the UE 115 may not transmit data and may adjust a corresponding beam specific failure counter and/or timer for the second beam, such as illustrated and described further with reference to FIG. 7.

Between 620 and 625, the UE 115 may perform additional channel sensing operations and may switch between additional beams. For example, the UE 115 may switch from the second beam to a third beam, and so forth.

At 625, performs a channel sensing operation for a third particular beam, such as a third beam. For example, the UE 115 monitors for signals with a corresponding receive beam, that monitors for signals from a particular direction associated with the third beam. Responsive to a channel sensing success, the UE 115 may transmit data via the third beam. Responsive to a channel sensing failure, the UE 115 may not transmit data and may adjust a corresponding beam specific failure counter and/or timer for the third beam, such as illustrated and described further with reference to FIG. 7.

At 630, the UE 115 generates and transmits a beam specific failure message. For example, the UE 115 generates channel sensing failure information indicating a channel sensing failure for multiple or all beams based on the beam specific channel sensing failure determinations above. The channel sensing failure information may be included in a layer 1 or 2 transmission, such as a MAC CE or a physical layer data or control message, such as a PUSCH or PUCCH when transmitted to from a UE to a base station as in the example of FIG. 6. In other implementations, the UE 115 may transmit the channel sensing failure information to another device in addition to or the alternative of the base station 105.

At 635, the UE 115 and the base station 105 perform beam failure recovery operations. For example, the UE 115 performs recovery operations with the base station 105 to establish a new set of beams. To illustrate, the UE 115 and the base station 105 may perform recovery operations as set forth in release 15 or 16, such as described with reference to FIG. 3. As another illustration, the UE 115 and the base station 105 may perform recovery operations as described above with reference to FIGS. 4 and 5.

Thus, in the example in FIG. 6, the UE performs beam specific channel sensing failure operations for multiple or all beams. That is, the UE reports and attempts recovery from persistent beam failure after multiple beam failures, beam failures of a particular group, or all beams having failed.

Although the examples in FIGS. 5 and 6 illustrate the UE sending the failure reporting message to the base station 105 where the failure occurred and/or performing failure recovery operations with the base station 105 where the failure occurred, in other implementations other options are possible as described above.

For example, the UE 115 may send the recovery to a second device in addition to or in the alternative to sending the recovery message to the base station 105. To illustrate, in sidelink operations the UE 115 may send the message to another UE. As another illustration, the UE 115 may send the message to a second network entity instead of the base station 105, such as when the base station 105 is a SCell.

As another example, operations may be extended to PC5 type communications. For a given PC5 link, different configuration can be applied to different beams. For example, channel sensing failure can be declared when all beams experience channel sensing failures or partial channel sensing failure can be declared with a beam or group of beams. For mode 1 PC5 (where all transmissions and configuration are done by the gNB), LBT failure detection and configuration parameters for each beam are configured by the gNB. For mode 2 PC5 (which can work without gNB involvement), LBT failure detection and configuration parameters for each beam can be specified or pre-configured or suggested by the receiver. The partial LBT failure declaration is also configured by the base station 105 in mode 1 or via specification/pre-configuration/receiver recommendation in mode 2. With partial LBT failure detection for a group of beams, one node can indicate the LBT failure to another node via other beams which do not experience LBT failure. The indication can be sent in MAC CE in PSSCH or via enhanced PSFCH or via enhanced SL control information. In mode 1 PC5, the node can also send partial LBT failure report to gNB.

Figure 7:
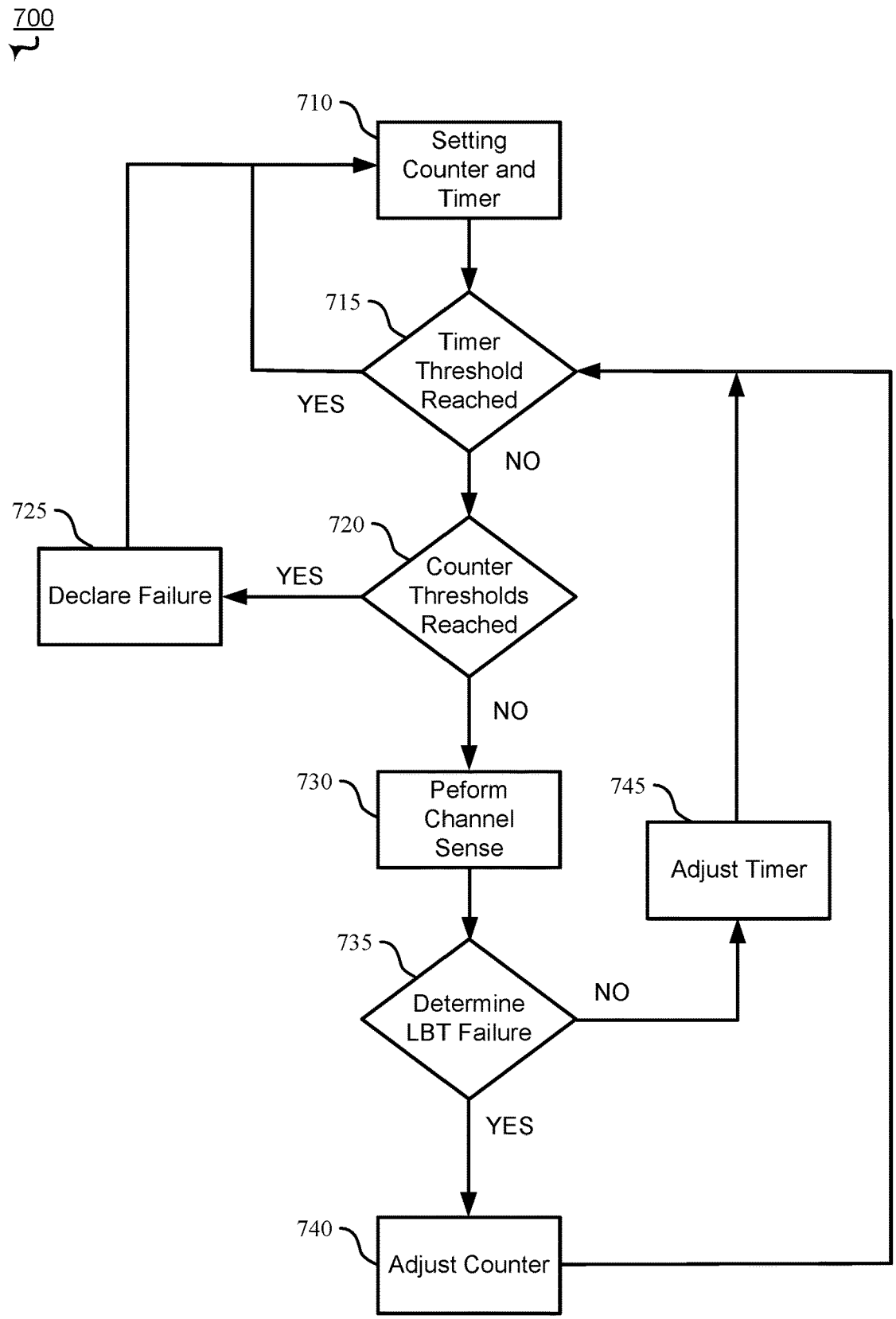
FIG. 7 is a block diagram illustrating beam specific channel sensing counter and timer operations according to one or more aspects.

FIG. 7 illustrates an example diagram of a logic flow diagram for beam specific channel operations according to some aspects. Referring to FIG. 7, FIG. 7 is a diagram 700 illustrating beam specific channel sensing failure timer and counter operations according to some aspects. In the example of FIG. 8, the diagram illustrates an exemplary logical process flow for beam specific channel sensing failure timer and counter operations. The logical process flow may illustrate actions by a wireless communication device operating in a contended medium.

As an illustrative example, during operation a UE may engage in beam specific channel sensing failure operations as shown in FIG. 7. The UE may perform channel sensing (e.g., LBT) operations and adjust beam specific counters and timers in response to the channel sensing operations. In the example of FIG. 7, the UE includes a LBT failure detection counter for each beam and a LBT failure detection timer for each beam, that is beam specific counters and timers.

The LBT failure detection counter for a particular beam tracks instances of LBT failure for that particular beam. The LBT failure detection timer for a particular beam enables the counter to track LBT failures that are not separated too far apart for that particular beam, that is failures that are not further than a threshold amount of time or transmissions apart from one another. The "timer" may be tracked in/use the units of transmissions or time.

The logical flow includes, at 710, setting the counter and timer. For example, a beam specific counter and/or timer may be set to values indicated by RRC configured parameters, such as lbt-FailureMaxCount. In a particular implementation, the timer may be set to zero At 715, the logical flow includes determining if the timer satisfies a condition. For example, a value of the beam specific timer is compared to a threshold value, such as lbt-FailureDetectionTimer.

If yes and the timer satisfies the condition, the logical flow returns to 710 to reset the counter and timer. Alternatively, if no and it was determined that the timer does not satisfy the condition at 715, the logical flow proceeds to 720. At 720, the logical flow includes determining if the counter satisfies a condition. For example, a value of the beam specific counter is compared to a threshold value, such as lbt-FailureInstanceMaxCount.

If yes and the counter satisfies the condition, the logical flow proceeds to 725. At 725, the logical flow includes declaring a beam specific channel sensing failure and the logical flow returns to 710 to reset the counter and timer.

Alternatively, if no and it was determined that the counter does not satisfy the condition at 720, the logical flow proceeds to 730. At 730, the logical flow includes performing a channel sensing operation for the specific beam. For example, a particular type of LBT operation may be performed for a particular beam.

At 735, the logical flow includes determining if a channel sensing failure occurred for the specific beam. If yes and a channel sensing failure occurred, the logical flow proceeds to 740. At 740, the logical flow includes adjusting the counter and the logical flow returns to 710 and determining if the timer threshold is reached.

Alternatively, if no and it was determined that no channel sensing occurred at 735, the logical flow proceeds to 745. At 745, the logical flow includes adjusting the timer and the logical flow returns to 710 and determining if the timer threshold is reached. For example, the timer may be incremented or decremented, that is adjusted towards the threshold value. This logical flow may be repeated for one or more beams based on the beam specific failure mode.

An exemplary cycle of operation of the logical flow is described below. During operation, at a first time (T0), the UE sets, for each beam, a corresponding LBT failure detection counter to a threshold value (e.g., zero) and also sets a corresponding LBT failure detection timer to a threshold value (e.g., lbt-FailureDetectionTimer). One or both thresholds may be configurable. The first time may correspond to start-up, status change (e.g., RRC status change), BWP change, etc.

For a particular beam, the UE will adjust the corresponding LBT failure detection counter and LBT failure detection timer. For example, at a second time the UE performs a LBT on a transmission signal for the particular beam. If the LBT fails, the UE adjusts the LBT failure detection counter and resets the LBT failure detection timer to the threshold (e.g., starting or reset threshold).

To illustrate, the UE increases the LBT failure detection counter by 1 and resets the LBT failure detection timer to the value of the configured lbt-FailureDetectionTimer parameter.

The transmission is not sent on the beam when the LBT fails.

If the LBT is a success, the transmission is sent via the particular beam and the counter is not adjusted (e.g., not increased). The timer counters to adjust (e.g., decrement or increment) based on time elapsed and is not reset to a threshold value (e.g., lbt-FailureDetectionTimer).

At a third time (T3), the UE performs a second LBT operation for a next transmission (e.g., second signal/channel) for the same particular beam as the transmission (e.g., first signal) at T2. If the second LBT fails, the UE adjusts the LBT failure detection counter and resets the LBT failure detection timer to the threshold (e.g., starting or reset threshold)

If the second LBT succeeds, the UE transmits the second transmission. Additionally, the UE does not adjust the LBT failure detection counter and adjusts the LBT failure detection timer.

To illustrate, the UE does not does not increase the LBT failure detection counter and the UE decreases (or increases) the LBT failure detection timer by 1.

The above processes may be repeated at subsequent times (e.g., T4, T5, T6, . . . , etc.). If the LBT failure detection counter is equal to (or not less than) a threshold value (e.g., lbt-FailureInstanceMaxCount), the UE declares persistent LBT failure and the reporting procedure will kick in.

If the LBT failure detection timer equals a threshold value (e.g., decreases to 0) while the LBT failure detection counter is still less than the threshold value (e.g., lbt-FailureInstanceMaxCount), then a persistent LBT failure is not claimed to be detected and the UE resets the LBT failure detection counter to the threshold value (e.g., zero). This cycle of operation may be repeated for other beams if the beam specific persistent LBT failure detection is configured on that beam.

Additionally, or alternatively, one or more operations of FIGS. 4-7 may be added, removed, substituted in other implementations. For example, in some implementations, the example steps of FIGS. 5 and 6 may be used together. To illustrate, a device may switch between the operations of FIGS. 5 and 6 responsive to an indication from a host device or responsive to a determination (e.g., a determination regarding beam performance). As another example, some of the operations of FIGS. 4 and 7 may be used with the steps of any of FIGS. 5 and 6.

Figure 10:
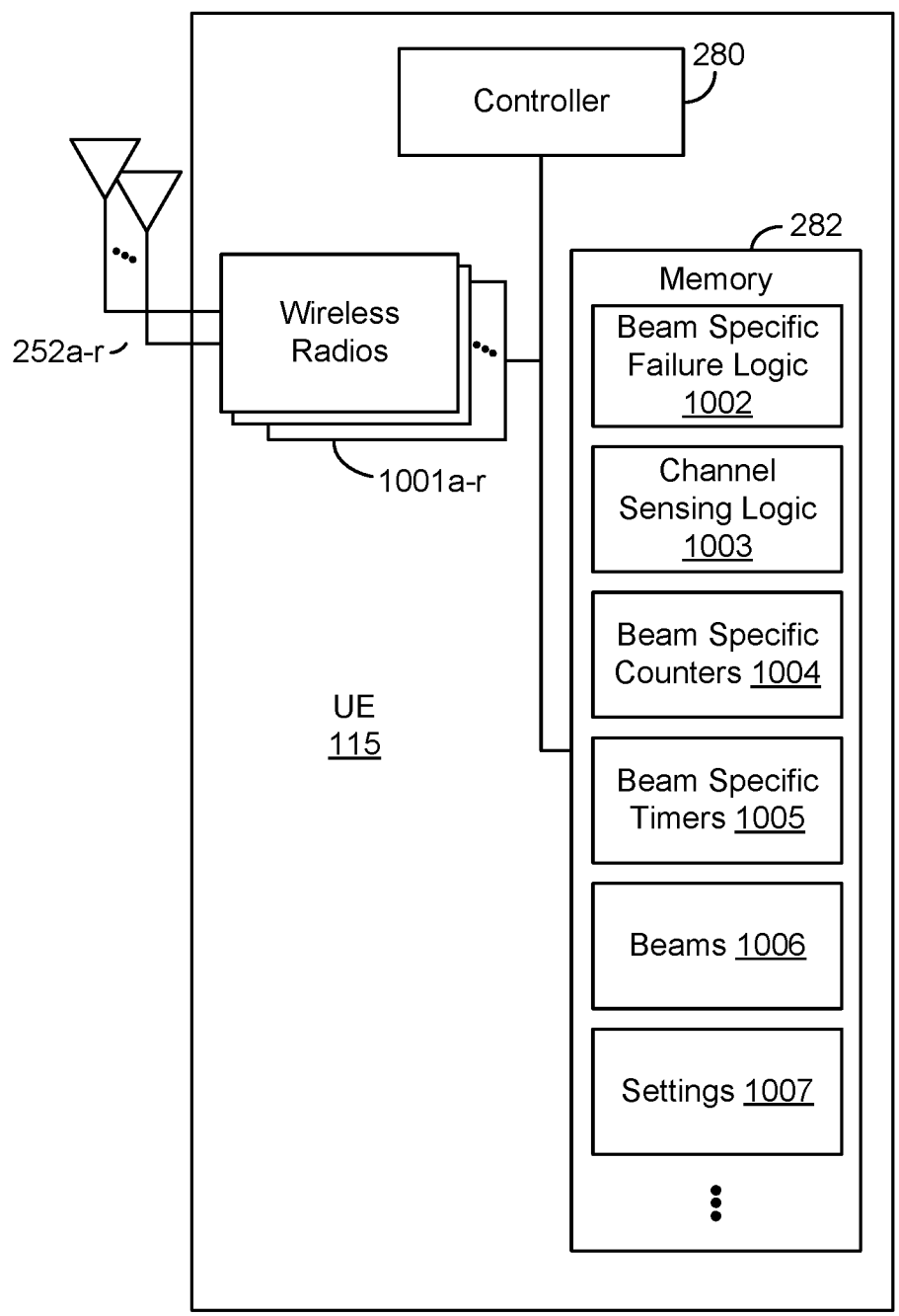
FIG. 10 is a block diagram of an example UE that supports use of beam specific channel sensing operations according to one or more aspects.

FIG. 8 is a flow diagram illustrating example blocks executed by a wireless communication device (e.g., a UE or base station) configured according to an aspect of the present disclosure. The example blocks will also be described with respect to UE 115 as illustrated in FIG. 10. FIG. 10 is a block diagram illustrating UE 115 configured according to one aspect of the present disclosure. UE 115 includes the structure, hardware, and components as illustrated for UE 115 of FIGS. 2 and/or 4. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1001a-r and antennas 252a-r. Wireless radios 1001a-r includes various components and hardware, as illustrated in FIG. 2 for UE 115, including modulator/demodulators 254a-r, MIMO detector 256, receive processor 258, transmit processor 264, and TX MIMO processor 266. As illustrated in the example of FIG. 10, memory 282 stores beam specific channel sensing failure logic 1002, channel sensing logic 1003, beam specific counters data 1004, beam specific timers data 1005, beams data 1006, and settings data 1007.

At block 800, a wireless communication device, such as a UE, performs a channel sensing operation prior to transmitting a first transmission via a first particular beam of a plurality of beams. For example, the UE 115 performs an energy sensing operation for/with a particular beam, as described with reference to FIGS. 4-7. To illustrate, the UE 115 performs a LBT operation for a particular beam to determine if the UE 115 can subsequently transmit.

At block 801, the UE 115 determines a beam specific channel sensing failure for the particular beam based on performing the channel sensing operation. For example, the UE 115 determines that the channel sensing operation failed, as described with reference to FIGS. 4-7. To illustrate, the detected energy of the medium may be greater than or equal to a threshold amount or the UE 115 may detect a signal that another device is transmitting or attempting to transmit (e.g., the medium is not clear for a long enough duration). In response to this failure, or alternatively a success, the UE 115 may adjust a corresponding beam specific counter and timer as described in FIGS. 4-7.

At block 802, the UE 115 transmits channel sensing failure information indicating a channel sensing failure for the particular beam and based on the beam specific channel sensing failure and one or more previous beam specific channel sensing failures. For example, the UE 115 may generate and transmit a channel sensing failure report indicating persistent channel sensing failure for at least the particular beam based on a series of two or more failures, as described with reference to FIGS. 4-7. In some implementations, the channel sensing failure report may indicate persistent channel sensing failure for multiple or all beams. The UE 115 may determine to generate and/or transmit the channel sensing failure report based on the counter and/or timer for the particular beam satisfying a threshold or condition. After detection and reporting the beam specific failure, the UE 115 and the other wireless device (e.g., second UE or base station) may perform one or more operations as described in FIGS. 3-7 to recover from the beam specific failure.

The wireless communication device (e.g., UE or base station) may execute additional blocks (or the wireless communication device may be configured further perform additional operations) in other implementations. For example, the wireless communication device (e.g., the UE 115) may perform one or more operations described above. As another example, the wireless communication device (e.g., the UE 115) may perform one or more aspects as presented below.

In a first aspect, the UE 115 further determines not to transmit the first transmission for the particular beam based on performing the channel sensing operation.

In a second aspect, alone or in combination with the first aspect, the UE 115, prior to performing the channel sensing operation, further: performs a second channel sensing operation prior to transmitting a second transmission via the first particular beam; and determines a second beam specific channel sensing failure for the particular beam based on performing the second channel sensing operation, where the channel sensing failure information indicates persistent beam failure for the first particular beam.

In a third aspect, alone or in combination with one or more of the above aspects, the UE 115, prior to performing the second channel sensing operation, further: performs a third channel sensing operation prior to transmitting a third transmission via a second particular beam of the plurality of beams; and determines a third beam specific channel sensing failure for the second particular beam based on performing the third channel sensing operation, where the channel sensing failure information indicates persistent beam failure for the first particular beam and the second particular beam.

In a fourth aspect, alone or in combination with one or more of the above aspects, the wireless communication device is configured to operate with a plurality of beams, where each beam of the plurality of beams has a corresponding channel sensing failure counter and a corresponding channel sensing timer.

In a fifth aspect, alone or in combination with one or more of the above aspects, the wireless communication device is configured to operate with a plurality of beams, where the plurality of beams includes multiple groups of beams, and where each group beams of the multiple groups has a corresponding channel sensing failure counter and a corresponding channel sensing timer.

In a sixth aspect, alone or in combination with one or more of the above aspects, the UE 115 further sets (e.g., resets) a particular beam channel sensing timer (e.g., lbt-FailureDetectionTimer) to a starting value in response entering a beam specific channel sensing mode, and sets (e.g., resets) a particular beam channel sensing counter to a starting value in response to entering the beam specific channel sensing mode.

In a seventh aspect, alone or in combination with one or more of the above aspects, the UE 115 sets (e.g., resets) a particular beam channel sensing timer (e.g., lbt-FailureDetectionTimer) to a starting value in response to a channel sensing failure for a corresponding beam, and adjusts (e.g., increments/decrements) a particular beam channel sensing counter (e.g., adjusting a value thereof) in response to the channel sensing failure for the corresponding beam.

In an eighth aspect, alone or in combination with one or more of the above aspects, the UE 115 further adjusts (e.g., increments/decrements) a particular beam channel sensing timer in response to a channel sensing success for a corresponding beam, and maintains (e.g., not adjusts) a particular beam channel sensing counter condition (e.g., lbt-FailureInstanceMaxCount) in response to the channel sensing success for the corresponding beam.

In a ninth aspect, alone or in combination with one or more of the above aspects, the UE 115 further sets (e.g., resets) the particular beam channel sensing counter to a threshold value in response to the particular beam channel sensing counter satisfying a reset condition (e.g., a failure indication condition, such as lbt-FailureInstanceMaxCount threshold).

In a tenth aspect, alone or in combination with one or more of the above aspects, a threshold or a starting value for a channel sensing failure timer (lbt-FailureDetectionTimer) and a threshold or a starting value for a channel sensing failure counter (lbt-FailureInstanceMaxCount) are different for different beams of a plurality of beams configured for use by the wireless communication device.

In an eleventh aspect, alone or in combination with one or more of the above aspects, a threshold or a starting value for a channel sensing failure timer (lbt-FailureDetectionTimer) and a threshold or a starting value for a channel sensing failure counter (lbt-FailureInstanceMaxCount) are different for different modes (e.g., Uu or PC) or different channels (e.g., uplink, downlink, or sidelink).

In a twelfth aspect, alone or in combination with one or more of the above aspects, the UE 115 further: receives a grant indicating one or more virtual transmission opportunities for the particular beam; performs a second channel sensing operation for a first virtual transmission opportunity of the one or more virtual transmission opportunities and the particular beam; and determines a second beam specific channel sensing failure for the particular beam based on unsuccessfully performing the second channel sensing operation; or refrains from transmitting for the first virtual transmission opportunity based on successfully performing the second channel sensing operation.

In a thirteenth aspect, alone or in combination with one or more of the above aspects, the UE 115 further: performs a third channel sensing operation for a second virtual transmission opportunity of the one or more virtual transmission opportunities and the particular beam; and determines a third beam specific channel sensing failure for the particular beam based on unsuccessfully performing the third channel sensing operation; or refrains from transmitting for the second virtual transmission opportunity based on successfully performing the third channel sensing operation.

In a fourteenth aspect, alone or in combination with one or more of the above aspects, the channel sensing failure information indicates that a subset of beams of the plurality of beams experience persistent channel sensing failure.

In a fifteenth aspect, alone or in combination with one or more of the above aspects, the UE 115 further: switches from the particular beam to a second particular beam; attempts to transmit a second transmission for the second particular beam; performs second channel sensing for the second transmission and the second particular beam; determines not to transmit the second transmission for the second particular beam; and determines a second beam specific channel sensing failure for the second particular beam, where the channel sensing failure information further indicates a second channel sensing failure for the second particular beam and is generated based on the second beam specific channel sensing failure.

In a sixteenth aspect, alone or in combination with one or more of the above aspects, the channel sensing failure information indicates that all beams of the plurality of beams experience persistent channel sensing failure.

In a seventeenth aspect, alone or in combination with one or more of the above aspects, the UE 115 further: switches from the particular beam to a second particular beam; attempts to transmit a second transmission for the second particular beam; performs second channel sensing for the second transmission and the second particular beam; determines not to transmit the second transmission for the second particular beam; determines a second beam specific channel sensing failure for the second particular beam; and transmits second channel sensing failure information indicating a second channel sensing failure for the second particular beam and based on the second beam specific channel sensing failure.

In an eighteenth aspect, alone or in combination with one or more of the above aspects, the channel sensing operation includes or corresponds to a channel sensing operation or an energy sensing operation.

In a nineteenth aspect, alone or in combination with one or more of the above aspects, channel sensing failure information is included in a channel sensing failure report transmission, and the channel sensing failure report transmission comprises MAC CE or a physical layer (layer 1) channel transmission.

In a twentieth aspect, alone or in combination with one or more of the above aspects, the channel sensing failure report transmission comprises a PUCCH, a PUSCH, a PDCCH, a PSCCH, or a PSFCH transmission.

In a twenty-first aspect, alone or in combination with one or more of the above aspects, the channel sensing failure report transmission is a UCI, a DCI, or a SCI.

In a twenty-second aspect, alone or in combination with one or more of the above aspects, the channel sensing failure report transmission is sent to a base station, a UE, or both.

In a twenty-third aspect, alone or in combination with one or more of the above aspects, the channel sensing failure information is sent to a first device in a first channel sensing failure report message, and the UE 115 further: transmits a second channel sensing failure report message to a second device, the second channel sensing failure report message including the channel sensing failure information indicating the channel sensing failure for the particular beam and based on the beam specific channel sensing failure.

In a twenty-fourth aspect, alone or in combination with one or more of the above aspects, the channel sensing failure information is sent to a first device in a first channel sensing failure report message using a second beam different from particular beam, and the first device is a serving cell on which the beam specific channel sensing failure occurred.

In a twenty-fifth aspect, alone or in combination with one or more of the above aspects, the channel sensing operation comprises a listen-before-talk (LBT) operation, and the LBT operation comprises a category (CAT) 1 LBT operation, a CAT 2 LBT operation, a CAT 3 LBT operation, or a CAT 4 LBT operation.

In a twenty-sixth aspect, alone or in combination with one or more of the above aspects, the channel sensing failure is beam specific and for a SCell, and where a channel sensing failure report transmission is sent to a master node for a master cell group (MCG) or a secondary node for a secondary cell group (SCG).

In a twenty-seventh aspect, alone or in combination with one or more of the above aspects, the channel sensing failure is beam specific and for a SpCell, and the UE 115 further: switches to another BWP that is configured with RACH resources, where the other BWP is associated with a second plurality of beams; and performs RACH procedures with one or more beams of the second plurality of beams, where the channel sensing failure information is included in a MAC CE and the MAC CE is transmitted responsive to performing the RACH procedures.

In a twenty-eighth aspect, alone or in combination with one or more of the above aspects, channel sensing failures are detected for each beam of each BWP configured with RACH resources, and the UE 115 further: determines a SCG radio link failure (RLF); and transmits an indication of the SCG RLF to a master node (which may be part of a MCG) via SCGFailureInformation.

In a twenty-ninth aspect, alone or in combination with one or more of the above aspects, the channel sensing failures are detected for each beam of each BWP configured with RACH resources, and the UE 115 further: determines a RLF; transmits an indication of the RLF; and performs RRC connection setup operations.

Accordingly, wireless communication devices may perform enhanced channel sensing failure detection, reporting, and recovery operations. By performing enhanced packet compression operations throughput may be increased and latency may be reduced through faster and more efficient channel sensing failure detection, reporting, and/or recovery.

Figure 11:
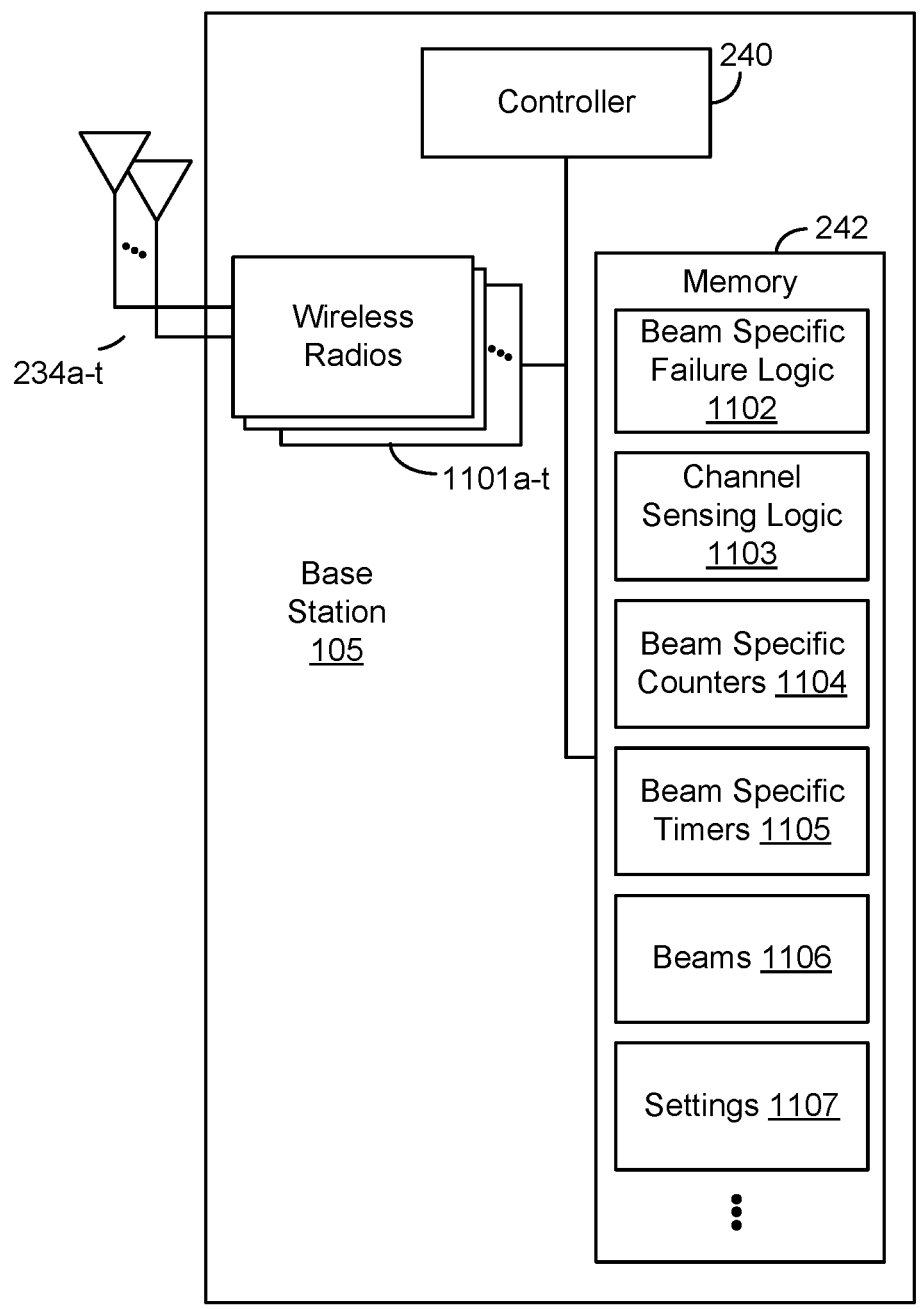
FIG. 11 is a block diagram of an example base station that supports use of beam specific channel sensing operations according to one or more aspects.

FIG. 9 is a flow diagram illustrating example blocks executed wireless communication device (e.g., a UE or base station) configured according to an aspect of the present disclosure. The example blocks will also be described with respect to base station 105 as illustrated in FIG. 11. FIG. 11 is a block diagram illustrating base station 105 configured according to one aspect of the present disclosure. Base station 105 includes the structure, hardware, and components as illustrated for base station 105 of FIGS. 2 and/or 4. For example, base station 105 includes controller/processor 280, which operates to execute logic or computer instructions stored in memory 282, as well as controlling the components of base station 105 that provide the features and functionality of base station 105. Base station 105, under control of controller/processor 280, transmits and receives signals via wireless radios 1101a-t and antennas 234a-t. Wireless radios 1101a-t includes various components and hardware, as illustrated in FIG. 2 for base station 105, including modulator/demodulators 232a-r, MIMO detector 236, receive processor 238, transmit processor 220, and TX MIMO processor 230. As illustrated in the example of FIG. 11, memory 282 stores beam specific channel sensing failure logic 1102, channel sensing logic 1103, beam specific counters data 1104, beam specific timers data 1105, beams data 1106, and settings data 1107.

At block 900, a wireless communication device, such as a base station 105, transmits beam specific channel sensing failure configuration information. For example, the base station 105 transmits a configuration transmission 450 including settings data 444, as described with reference to FIG. 4. Alternatively, the base station 105 transmits beam specific channel sensing failure configuration information in another message. The beam specific channel sensing failure configuration information may indicate one or more settings or configurations for beam specific channel sensing failure detection, reporting, and/or recovery operations. As illustrative, non-limiting examples, the beam specific channel sensing failure configuration information may indicate timer and/or counter values, thresholds or conditions or may indicate a particular mode (e.g., single beam or multiple beam reporting).

At block 901, the base station 105 receives channel sensing failure information indicating a channel sensing failure for a particular beam and based on multiple beam specific channel sensing failures. For example, the base station 105 may receive a channel sensing failure report indicating persistent channel sensing failure for at least the particular beam based on a series of two or more failures at another device, as described with reference to FIGS. 4-7. In some implementations, the channel sensing failure report may indicate persistent channel sensing failure for multiple beams or all beams. After detection and reporting the beam specific failure, the base station 105 and the other wireless device (e.g., UE) may perform one or more operations as described in FIGS. 3-7 to recover from the beam specific failure.

The wireless communication device (e.g., such as UE or base station) may execute additional blocks (or the wireless communication device may be configured further perform additional operations) in other implementations. For example, the wireless communication device may perform one or more operations described above. As another example, the wireless communication device may perform one or more aspects as described with reference to FIG. 8.

In a first aspect, the beam specific channel sensing failure configuration information includes one or more beam specific channel sensing failure counter conditions, one or more beam specific channel sensing failure timer conditions, or both.

In a second aspect, alone or in combination with the first aspect, the wireless communication device further: determines one or more transmissions resources indicating opportunities for UE to perform channel sensing to check for persistent channel sensing failure for the particular beam; generates one or more virtual transmission opportunities for the particular beam based on the one or more transmissions resources; transmits a grant indicating the one or more virtual transmission opportunities and the particular beam; and receives second channel sensing failure information indicating a second channel sensing failure for the particular beam and based on a second beam specific channel sensing failure for the one or more virtual transmission opportunities.

In a third aspect, alone or in combination with one or more of the above aspects, the wireless communication device further: determines one or more unscheduled transmissions resources; generates one or more virtual transmission opportunities for the particular beam based on the one or more unscheduled transmissions resources; and transmits a grant indicating the one or more virtual transmission opportunities and the particular beam, wherein the channel sensing failure information indicating the channel sensing failure for the particular beam is based on a second beam specific channel sensing failure for the one or more virtual transmission opportunities.

In a fourth aspect, alone or in combination with one or more of the above aspects, the wireless communication device further: removes one or more unscheduled transmissions resources; generates one or more virtual transmission opportunities for the particular beam based on the one or more unscheduled transmissions resources; and transmits a grant indicating the one or more virtual transmission opportunities and the particular beam, wherein the channel sensing failure information indicating the channel sensing failure for the particular beam is based on a second beam specific channel sensing failure for the one or more virtual transmission opportunities.

Accordingly, wireless communication devices may perform enhanced channel sensing failure detection, reporting, and recovery operations. By performing enhanced packet compression operations throughput may be increased and latency may be reduced through faster and more efficient channel sensing failure detection, reporting, and/or recovery.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-11 include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication comprising:
    performing, by a wireless communication device, a first beam specific channel sensing operation prior to transmitting a first transmission via a first particular beam of a plurality of beams;
    determining, by the wireless communication device, a first channel sensing failure for the first particular beam based on performing the first beam specific channel sensing operation;
    sending, based on determining the first channel sensing failure, first channel sensing failure information indicating the first channel sensing failure for the first transmission;
    performing, by the wireless communication device, a second beam specific channel sensing operation prior to transmitting a second transmission via a second particular beam of the plurality of beams;
    determining, by the wireless communication device, a second channel sensing failure for the second particular beam based on performing the second beam specific channel sensing operation; and
    sending, based on determining the second channel sensing failure, second channel sensing failure information indicating the second channel sensing failure for the second transmission.

2. The method of claim 1, wherein the first beam specific channel sensing operation comprises a listen-before-talk (LBT) operation, and wherein the LBT operation comprises a category (CAT) 1 LBT operation, a CAT 2 LBT operation, a CAT 3 LBT operation, or a CAT 4 LBT operation.

3. The method of claim 1, further comprising, prior to performing the first beam specific channel sensing operation:
   performing, by the wireless communication device, a third beam specific channel sensing operation prior to transmitting a third transmission via the first particular beam; and
   determining, by the wireless communication device, a third channel sensing failure for the first particular beam based on performing the third beam specific channel sensing operation; and
   transmit channel sensing failure information based on the first beam specific channel sensing failure and the third beam specific channel sensing failure, wherein the channel sensing failure information indicates persistent beam failure for the first particular beam.

4. The method of claim 3, wherein the channel sensing failure information indicates persistent beam failure for the first particular beam and the second particular beam, and wherein the performance of the second beam specific channel sensing operation is performed prior to the third beam specific channel sensing operation.

5. The method of claim 1, further comprising:
   setting a particular beam channel sensing timer to a starting value in response entering a beam specific channel sensing mode; and
   setting a particular beam channel sensing counter to a starting value in response to entering the beam specific channel sensing mode.

6. The method of claim 1, further comprising:
   setting a particular beam channel sensing timer to a starting value in response to a channel sensing failure for a corresponding beam; and
   adjusting a particular beam channel sensing counter in response to the channel sensing failure for the corresponding beam.

7. The method of claim 6, further comprising:
   setting the particular beam channel sensing counter to a threshold value in response to the particular beam channel sensing counter satisfying a reset condition.

8. The method of claim 1, further comprising:
   adjusting a particular beam channel sensing timer in response to a channel sensing success for a corresponding beam; and
   maintaining a particular beam channel sensing counter condition in response to the channel sensing success for the corresponding beam.

9. The method of claim 8, further comprising:
   setting the particular beam channel sensing counter to a threshold value in response to the particular beam channel sensing timer satisfying a reset condition.

10. An apparatus configured for wireless communication, comprising:
    at least one processor; and
    a memory coupled to the at least one processor,
    wherein the at least one processor is configured to:
      perform, by a wireless communication device, a first beam specific channel sensing operation prior to transmitting a first transmission via a first particular beam of a plurality of beams;
      determine, by the wireless communication device, a first channel sensing failure for the first particular beam based on performing the first beam specific channel sensing operation;
      sending, based on determining the first channel sensing failure, first channel sensing failure information indicating the first channel sensing failure for the first transmission;
      perform, by the wireless communication device, a second beam specific channel sensing operation prior to transmitting a second transmission via a second particular beam of the plurality of beams;
      determine, by the wireless communication device, a second channel sensing failure for the second particular beam based on performing the second beam specific channel sensing operation; and
      sending, based on determining the second channel sensing failure, second channel sensing failure information indicating the second channel sensing failure for the second transmission.

11. The apparatus of claim 10, wherein the first beam specific channel sensing operation includes or corresponds to an energy sensing operation.

12. The apparatus of claim 10, wherein the wireless communication device is configured to operate with a plurality of beams, wherein each beam of the plurality of beams has a corresponding channel sensing failure counter and a corresponding channel sensing timer.

13. The apparatus of claim 10, wherein the wireless communication device is configured to operate with a plurality of beams, wherein the plurality of beams includes multiple groups of beams, and wherein each group beams of the multiple groups has a corresponding channel sensing failure counter and a corresponding channel sensing timer.

14. The apparatus of claim 10, wherein a threshold or a starting value for a channel sensing failure timer and a threshold or a starting value for a channel sensing failure counter are different for different beams of a plurality of beams configured for use by the wireless communication device.

15. The apparatus of claim 10, wherein a threshold or a starting value for a channel sensing failure timer and a threshold or a starting value for a channel sensing failure counter are different for different modes, different channels, or both.

16. The apparatus of claim 10, wherein the processor is further configured to:
    receive, by the wireless communication device, a grant indicating one or more virtual transmission opportunities for the first particular beam;
    perform, by the wireless communication device, a third beam specific channel sensing operation for a first virtual transmission opportunity of the one or more virtual transmission opportunities and the first particular beam; and
    determine, by the wireless communication device, a third channel sensing failure for the first particular beam based on unsuccessfully performing the third beam specific channel sensing operation; or
    refrain, by the wireless communication device, from transmitting for the first virtual transmission opportunity based on successfully performing the third beam specific channel sensing operation.

17. The apparatus of claim 16, wherein the processor is further configured to:
    perform, by the wireless communication device, a fourth beam specific channel sensing operation for a second virtual transmission opportunity of the one or more virtual transmission opportunities and the first particular beam; and determine, by the wireless communication device, a fourth channel sensing failure for the first particular beam based on unsuccessfully performing the fourth beam specific channel sensing operation; or refrain, by the wireless communication device, from transmitting for the second virtual transmission opportunity based on successfully performing the fourth beam specific channel sensing operation.

18. The apparatus of claim 10, wherein the processor is further configured to:

transmit, by the wireless communication device, channel sensing failure information indicating a channel sensing failure for the first particular beam and the second particular beam, the channel sensing failure based on the first channel sensing failure, the second channel sensing failure, and one or more previous beam specific channel sensing failures, wherein the channel sensing failure information indicates that a subset of beams of the plurality of beams experience persistent channel sensing failure.

19. The apparatus of claim 18, wherein the processor is further configured to:

determine, by the wireless communication device, not to transmit the first transmission for the first particular beam based on performance of the first beam specific channel sensing operation;

switch, by the wireless communication device, from the first particular beam to the second particular beam;

attempt, by the wireless communication device, to transmit the second transmission for the second particular beam; and determine, by the wireless communication device, not to transmit the second transmission for the second particular beam, wherein the channel sensing failure information further indicates a second channel sensing failure for the second particular beam.

20. An apparatus configured for wireless communication, the apparatus comprising:

means for performing, by a wireless communication device, a first beam specific channel sensing operation prior to transmitting a first transmission via a first particular beam of a plurality of beams;

means for determining, by the wireless communication device, a first channel sensing failure for the first particular beam based on performing the first beam specific channel sensing operation;

means for sending, based on determining the first channel sensing failure, first channel sensing failure information indicating the first channel sensing failure for the first transmission;

means for performing, by the wireless communication device, a second beam specific channel sensing operation prior to transmitting a second transmission via a second particular beam of the plurality of beams;

means for determining, by the wireless communication device, a second channel sensing failure for the second particular beam based on performing the second beam specific channel sensing operation; and means for sending, based on determining the second channel sensing failure, second channel sensing failure information indicating the second channel sensing failure for the second transmission.

21. The apparatus of claim 20, the apparatus further comprising:

means for transmitting channel sensing failure information indicating that all beams of the plurality of beams experience persistent channel sensing failure based on the first channel sensing failure, the second channel sensing failure, and one or more previous beam specific channel sensing failures.

22. The apparatus of claim 20, wherein channel sensing failure information is included in a channel sensing failure report transmission, and wherein the channel sensing failure report transmission comprises Medium Access Control Element (MAC CE) or a physical layer channel transmission.

23. The apparatus of claim 22, wherein the channel sensing failure report transmission comprises a Physical Uplink Control Channel (PUCCH), a Physical Uplink Shared Channel (PUSCH), a Physical Downlink Control Channel (PDCCH), a Physical Sidelink Control Channel (PSCCH), or a Physical Sidelink Feedback Channel (PSFCH) transmission.

24. The apparatus of claim 22, wherein the channel sensing failure report transmission is an uplink control information (UCI), a downlink control information (DCI), or a sidelink control information (SCI).

25. A non-transitory computer-readable medium storing instructions that, when executed by a processor, cause the processor to perform operations comprising:

performing, by a wireless communication device, a first beam specific channel sensing operation prior to transmitting a first transmission via a first particular beam of a plurality of beams;

determining, by the wireless communication device, a first channel sensing failure for the first particular beam based on performing the first beam specific channel sensing operation;

sending, based on determining the first channel sensing failure, first channel sensing failure information indicating the first channel sensing failure for the first transmission;

performing, by the wireless communication device, a second beam specific channel sensing operation prior to transmitting a second transmission via a second particular beam of the plurality of beams;

determining, by the wireless communication device, a second channel sensing failure for the second particular beam based on performing the second beam specific channel sensing operation; and sending, based on determining the second channel sensing failure, second channel sensing failure information indicating the second channel sensing failure for the second transmission.

26. The non-transitory computer-readable medium of claim 25, wherein the operations further comprise:

transmitting, by the wireless communication device, channel sensing failure information indicating a channel sensing failure for the first particular beam and the second particular beam, the channel sensing failure based on the first channel sensing failure, the second channel sensing failure, and one or more previous beam specific channel sensing failures, wherein the channel sensing failure information is included in a channel sensing failure report transmission, and wherein the channel sensing failure report transmission is sent to a base station, a UE, or both.

27. The non-transitory computer-readable medium of claim 26, wherein the channel sensing failure information is sent to a first device in a first channel sensing failure report message, and further comprising:

transmitting, by the wireless communication device, a second channel sensing failure report message to a second device, the second channel sensing failure report message including the channel sensing failure information indicating the channel sensing failure for the first particular beam and the second particular beam.

28. The non-transitory computer-readable medium of claim 26, wherein the channel sensing failure information is sent to a first device in a first channel sensing failure report message using a beam different from the first particular beam and the second particular beam, and wherein the first device is a serving cell on which the first channel sensing failure occurred.

29. The method of claim 1, wherein sending the first channel sensing failure information includes sending the first channel sensing failure information to a medium access control (MAC) layer, and wherein sending the second channel sensing failure information includes sending the second channel sensing failure information to the MAC layer.

30. The method of claim 1, further comprising:
detecting a consistent LBT failure based on the first and second channel sensing failure information; and
transmitting, by the wireless communication device, consistent LBT failure information indicating the detected consistent LBT failure.

* * * * *